United States Patent
Kojima

(10) Patent No.: US 10,609,126 B2
(45) Date of Patent: Mar. 31, 2020

(54) COMMUNICATION DEVICE, COMMUNICATION SYSTEM, AND CONTROL METHOD OF COMMUNICATION DEVICE

(71) Applicant: FUJITSU LIMITED, Kawasaki-shi, Kanagawa (JP)

(72) Inventor: Yuji Kojima, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 7 days.

(21) Appl. No.: 16/176,464

(22) Filed: Oct. 31, 2018

(65) Prior Publication Data
US 2019/0149596 A1    May 16, 2019

(30) Foreign Application Priority Data

Nov. 13, 2017    (JP) .................. 2017-218637

(51) Int. Cl.

| | |
|---|---|
| G06F 15/16 | (2006.01) |
| H04L 29/08 | (2006.01) |
| H04L 12/919 | (2013.01) |
| G06F 9/48 | (2006.01) |
| H04L 12/927 | (2013.01) |
| H04W 36/00 | (2009.01) |
| H04W 36/08 | (2009.01) |

(52) U.S. Cl.
CPC ........ *H04L 67/1002* (2013.01); *G06F 9/4856* (2013.01); *H04L 47/767* (2013.01); *H04L 47/805* (2013.01); *H04L 67/142* (2013.01); *H04L 67/148* (2013.01); *H04L 67/34* (2013.01); *H04W 36/0011* (2013.01); *H04W 36/08* (2013.01); *H04L 67/141* (2013.01)

(58) Field of Classification Search
CPC . H04L 67/1002; H04L 67/142; H04L 67/148; H04L 67/34; H04L 67/141; H04L 47/767; H04L 47/805; G06F 9/4856; H04W 36/0011; H04W 36/08
USPC ........................................................ 709/201
See application file for complete search history.

(56) References Cited

U.S. PATENT DOCUMENTS

2004/0111511 A1    6/2004    Maeda et al.

FOREIGN PATENT DOCUMENTS

| JP | 2004-078465 | 3/2004 |
|---|---|---|
| JP | 2004-088200 | 3/2004 |

*Primary Examiner* — Wing F Chan
*Assistant Examiner* — Joseph R Maniwang
(74) *Attorney, Agent, or Firm* — Fujitsu Patent Center

(57) ABSTRACT

There is provided a communication device as a first communication device of a plurality of communication devices, including a memory, and a processor coupled to the memory and the processor configured to execute a first process of holding a state of a terminal, based on information acquired from the terminal, execute a second process by communicating with the first process, and migrate the first process to a second communication device of the plurality of communication devices when it is detected that the terminal whose state is held by the processor is migrated from a first area managed by the first communication device to a second area managed by the second communication device and when a completion of an indivisible operation in communication between the first process and the second process is detected, based on a predetermined communication protocol.

6 Claims, 15 Drawing Sheets

FIG. 5

```
                                         ┌150
Atom#1:
    Put(A, *)
    Response(A, *)
    Put(B, *)
    Response(B, *)

Atom#2:
    Request(C, *)
    Response(C, *)
    Request(D, *)
    Response(D, *)

Atom#3:
    ......
    ......
       ⋮
```

COMMUNICATION DEVICE, COMMUNICATION SYSTEM, AND CONTROL METHOD OF COMMUNICATION DEVICE

CROSS-REFERENCE TO RELATED APPLICATION

This application is based upon and claims the benefit of priority of the prior Japanese Patent Application No. 2017-218637, filed on Nov. 13, 2017, the entire contents of which are incorporated herein by reference.

FIELD

The embodiments discussed herein are related to a communication device, a communication system, and a control method of the communication device.

BACKGROUND

In recent years, networks such as the Internet and mobile networks have been distributed widely, and the terminals may utilize application programs involving data transmission/reception everywhere. Among these, there is a cloud computing technique in which resources are accessed on a network using a high speed and broadband line on the Internet. For example, in the cloud computing, each terminal accesses and processes an application program that operates with the resources on the cloud which is accessible by all subordinate terminals. In recent years, devices connected to a network have spread to vehicles, household electrical appliances, and even the daily necessities, and a large amount of data are being transmitted to communication lines. Therefore, due to the data transmission/reception by the terminals, situations where the line bandwidth is pressed often occur.

Therefore, in order to reduce the delay of access from a mobile station to an application, there has been proposed a technique in which an application is placed not on a cloud but on an edge server, and the edge server provides the mobile station with a low delay service. Here, the edge server refers to a server located near a mobile terminal, such as a server arranged for each area connected to the cloud. In a case of a mobile network such as LTE (Long Term Evolution), for example, the edge server is located near a base station.

An application installed in an edge server in a mobile network accommodates mobile stations such as plural mobile terminals. That is, the application installed in the edge server receives an access from plural mobile stations and performs a process according to a request. In such a system, it is common that the application has plural state holding processes which hold the state of each mobile station.

The mobile station receives a service from an application operating on the nearest low delay edge server. Therefore, when the edge server of a service provider is switched as the mobile station moves, the movement of the mobile station is detected and a state holding process of the moved mobile station is moved to an edge server serving as a new service provider. Then, the edge server serving as the new service provider uses the acquired state holding process of the mobile station to provide the service to mobile stations that has continuously moved in.

As a technique for migrating a process of an application to another machine, there is a technique in the related art that is called process migration in which a memory image of the entire process is acquired and transmitted as it is and is restored on a memory of a destination machine. Further, as a technique of this process migration, there is a technique in the related art in which a copy of a process is transmitted, the process is executed at a transmission source, and the execution record is reproduced after completion of the transmission to achieve synchronization. For example, in a case of Linux® OS (Operating System), process migration is implemented using a command called CRIU (Checkpoint Restart in Userspace).

Related techniques are disclosed in, for example, Japanese Laid-open Patent Publication Nos. 2004-088200, and 2004-078465.

SUMMARY

According to an aspect of the embodiments, a communication device as a first communication device of a plurality of communication devices, includes a memory, and a processor coupled to the memory and the processor configured to execute a first process of holding a state of a terminal, based on information acquired from the terminal, execute a second process by communicating with the first process, and migrate the first process to a second communication device of the plurality of communication devices when it is detected that the terminal whose state is held by the processor is migrated from a first area managed by the first communication device to a second area managed by the second communication device and when a completion of an indivisible operation in communication between the first process and the second process is detected, based on a predetermined communication protocol.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a view illustrating an example of a communication protocol;

DESCRIPTION OF EMBODIMENTS

Figure 1:
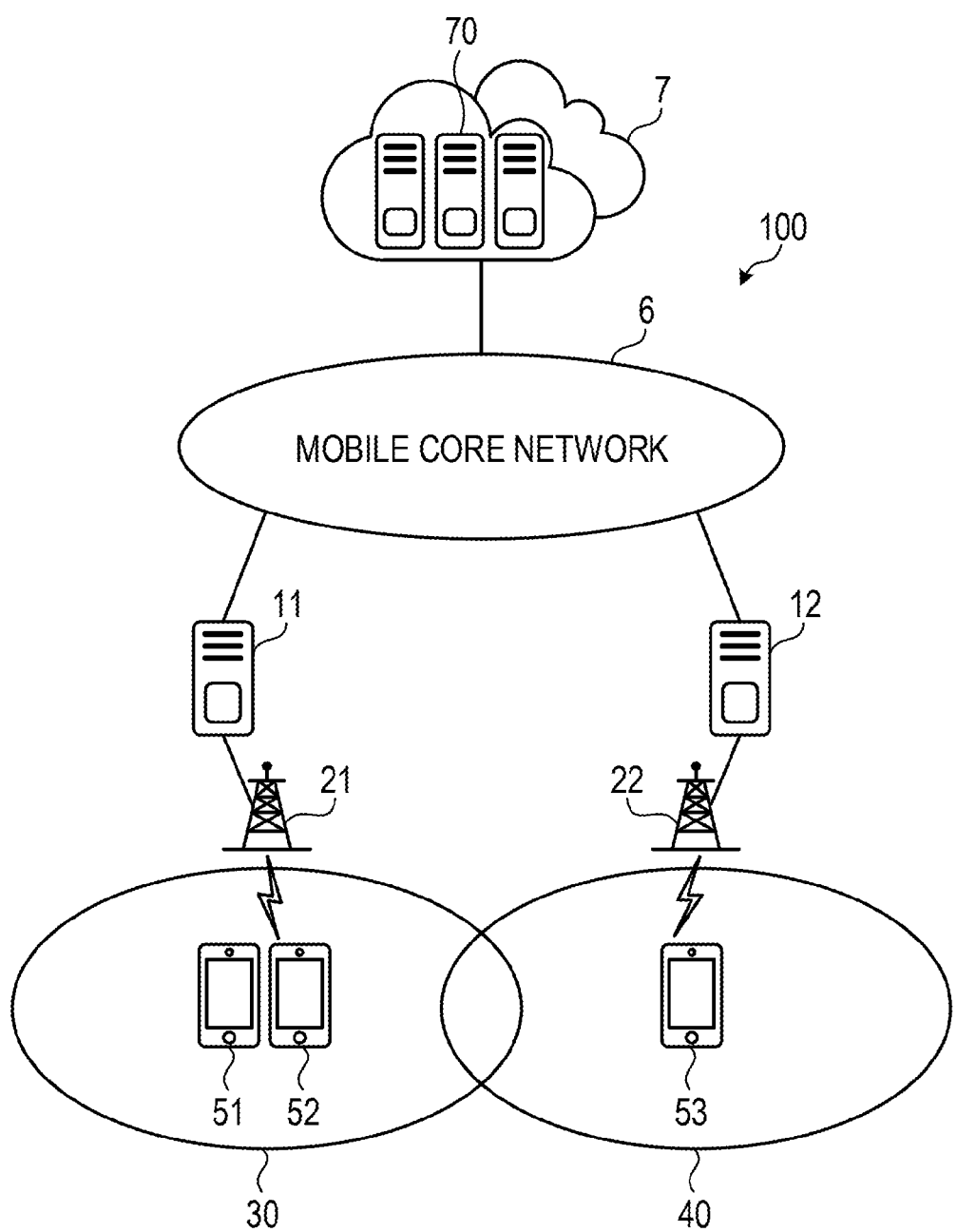
FIG. 1 is a system configuration diagram of a communication system.

As a system using an edge server, there is a system that uses a regional process of processing a service providing area for each edge server without holding the state of each mobile station separately from the state holding process. In this case, the state holding process and the regional process perform an inter-process communication to implement the function of an application in its entirety. Since this regional process does not hold the state of each mobile station, the regional process is not migrated even when an edge server that provides a service to the mobile station is switched.

Here, when migrating a process, the process may be migrated in consideration of an indivisible operation included in the process. The indivisible operation refers to a series of operations that may not be broken down on the way. The indivisible operation is also called an atomic operation, and the fact that a series of operations is indivisible may be referred to as having "atomicity".

In a case where an application has a state holding process that is migrated at the time of switching an edge server of a service provider and a regional process that is not migrated at the time of switching an edge server of a service provider, the migrated state holding process and the atomicity regarding the state holding process may be considered. Specifically, the atomicity in the migrated state holding process and the atomicity of inter-process communication between the state holding process and the regional process may be considered when the state holding process is migrated.

In this regard, the atomicity in the state holding process is solved by a process migration technique of the related art. By using the process migration technique of the related art, atomicity is secured continuously at any execution stage during process execution and, regardless of timing at which the state holding process is migrated, the atomicity in the state holding process is secured.

In contrast, the atomicity of inter-process communication between the state holding process and the regional process is hardly secured even by using the process migration technique of the related art. For example, in a case where migration of the state holding process occurs during execution of the indivisible operation in the inter-process communication, in the process migration technique of the related art, the state holding process is migrated without securing the atomicity of the inter-process communication. For this reason, it is continuously difficult for a new edge server of a service provider to process the migrated state holding process and make a communication. This is also true for the case of using the technique of the related art in which a copy of a process is transmitted, the process is executed at a transmission source, and the execution record is reproduced after completion of the transmission to achieve synchronization. That is, in the technique of the related art, it is difficult to migrate the state holding process in consideration of the atomicity of the inter-process communication and there is a possibility that the system stability may be damaged.

Embodiments of a communication device, a communication system, and a communication device control method configured to ensure the stability of a system disclosed in the present disclosure will now be described in detail with reference to the drawings. It is to be understood that the communication device, the communication system, and the communication device control method disclosed in the present disclosure are not limited by the following embodiments.

First Embodiment

FIG. 1 is a system configuration diagram of a communication system. As illustrated in FIG. 1, a communication system 100 according to the present embodiment includes plural servers 70, a mobile core network 6, edge servers 11 and 12, base stations 21 and 22, and mobile stations 51 to 53.

The servers 70 are connected to the mobile core network 6. The servers 70 are resources on a network. Here, a service provider that provides a cloud service that utilizes the servers 70 as the resources on the network is referred to as a cloud 7. Further, it is here assumed that the cloud 7 is connected to the mobile core network 6. An application that provides a cloud service is installed in the servers 70. The cloud 7 uses information collected by the edge servers 11 and 12 to provide services such as transmission of information on the entire communication area of each of the base stations 21 to 22 to the mobile stations 51 to 53.

The mobile core network 6 is a mobile network used for a wireless communication by the mobile stations 51 to 53. The mobile core network 6 includes, for example, an MME (Mobility Management Entity), and a gateway.

The edge servers 11 and 12 are connected to the mobile core network 6. Further, the edge server 11 is connected to the base station 21 and the edge server 12 is connected to the base station 22.

The edge servers 11 and 12 are equipped with applications that provide edge services. The edge servers 11 and 12 provide services using the individual situations of the mobile stations and provide services related to the communication areas of the base station 21 or 22 to which the edge servers 11 and 12 are connected. The edge servers 11 and 12 correspond to an example of a "communication device".

The base station 21 is connected to the edge server 11 and the base station 22 is connected to the edge server 12. Here, in the present embodiment, since the communication related to the edge service is mainly described, the base stations 21 and 22 are illustrated to be connected to the mobile core network 6 via the edge server 11 or 12 for convenience of explanation. However, the base stations 21 and 22 are generally connected directly to the mobile core network 6 in order to allow the mobile stations 51 to 53 to perform a wireless communication.

The base station 21 forms a cell 30 which is an area that may communicate with the base station 21. In addition, the base station 22 forms a cell 40 which is an area that may communicate with the base station 22. The base station 21 may communicate with the mobile stations 51 and 52 located in the cell 30. In addition, the base station 22 may communicate with the mobile station 53 located in the cell 40.

For example, when the mobile station 52 moves and is located in the cell 40, the base station 21 receives a request of handover to the base station 22 from the mobile station 52. Then, the base station 21 outputs the handover request to the edge server 11. Thereafter, the base station 21 receives a handover command from the edge server 11. Then, the base station 21 transmits the handover command to the mobile station 52.

Further, for example, when the mobile station 53 moves and is located in the cell 30, the base station 21 receives a handover completion notification from the mobile station 53. Then, the base station 21 transmits the handover completion notification to the edge server 11. Thereafter, the base station 21 receives a handover completion response from the edge server 11. Then, the base station 21 outputs the handover completion response to the mobile station 53. Thus, the handover of the mobile station 53 is completed. The base station 22 also has the same function as the base station 21.

The mobile stations 51 to 53 communicate with the base station 21 or 22 which forms a cell on the side where either cell 30 or 40 is located. For example, in the state of FIG. 1, the mobile station 52 communicates with the base station 21. Thereafter, when the mobile station 52 moves from the cell 30 to the cell 40, the mobile station 52 transmits a handover request directed to the base station 22 to the base station 21 based on, for example, the radio wave condition.

Thereafter, upon receiving the handover command from the base station 21, the mobile station 52 starts the handover. Then, the mobile station 52 switches from a radio wave for communication with the base station 21 to a radio wave for communication with the base station 22. Further, the mobile station 52 synchronizes the radio wave with the base station 22. When the synchronization of the radio wave is completed, the mobile station 52 transmits the handover completion notification to the handover destination base station 22. Thereafter, the mobile station 52 receives the handover completion response from the base station 22 and ends the handover process. After the end of the handover, the mobile station 52 performs a communication by making the base station 22 as the connection destination. The mobile stations 51 to 53 correspond to an example of a "terminal".

Figure 2:
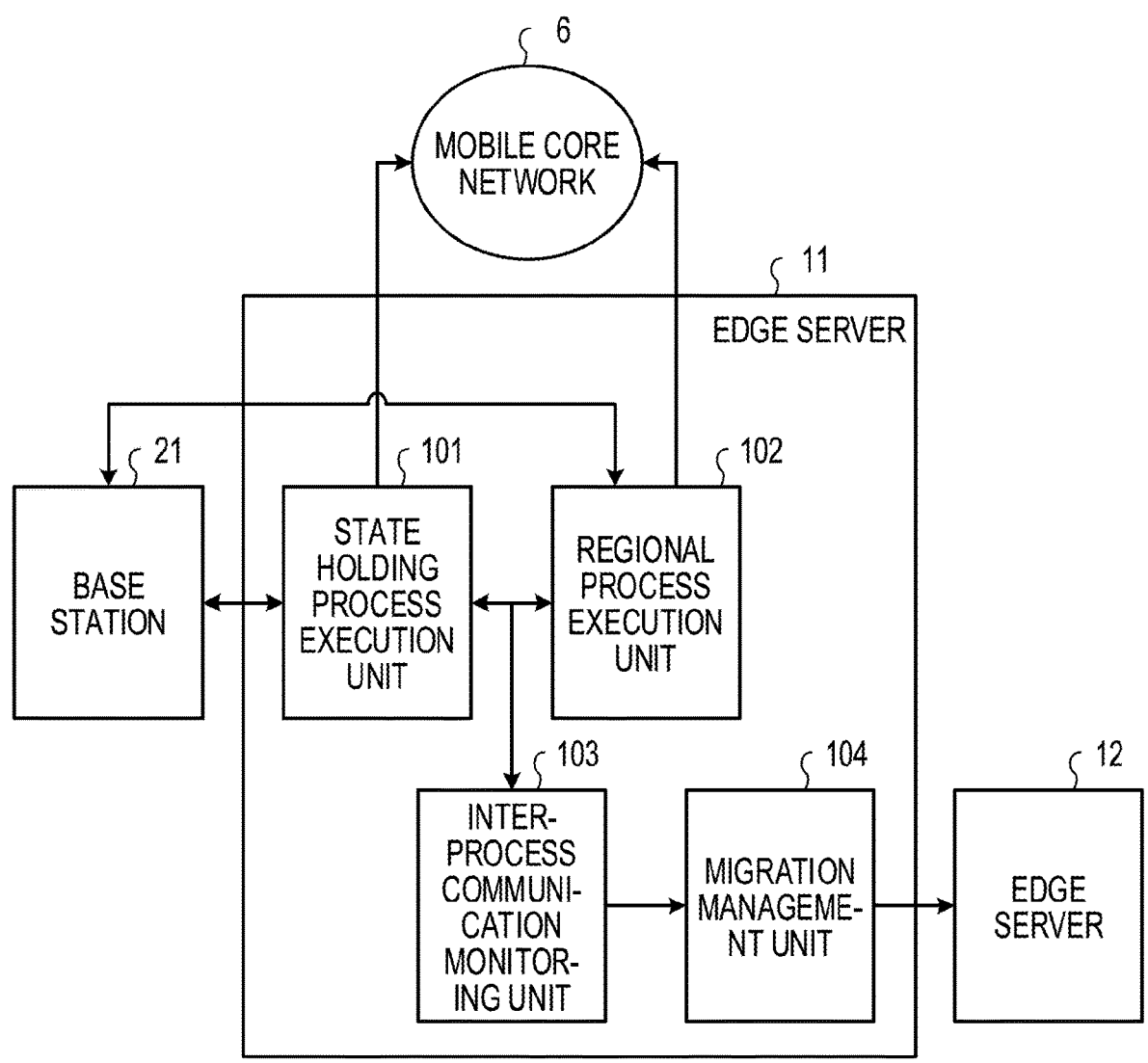
FIG. 2 is a block diagram of an edge server according to a first embodiment.

FIG. 2 is a block diagram of an edge server according to the first embodiment. As illustrated in FIG. 2, the edge server 11 includes a state holding process execution unit 101, a regional process execution unit 102, an inter-process communication monitoring unit 103, and a migration management unit 104. Here, the edge server 11 will be described as an example, but the edge server 12 also has similar functions to the edge server 11.

Figure 3:
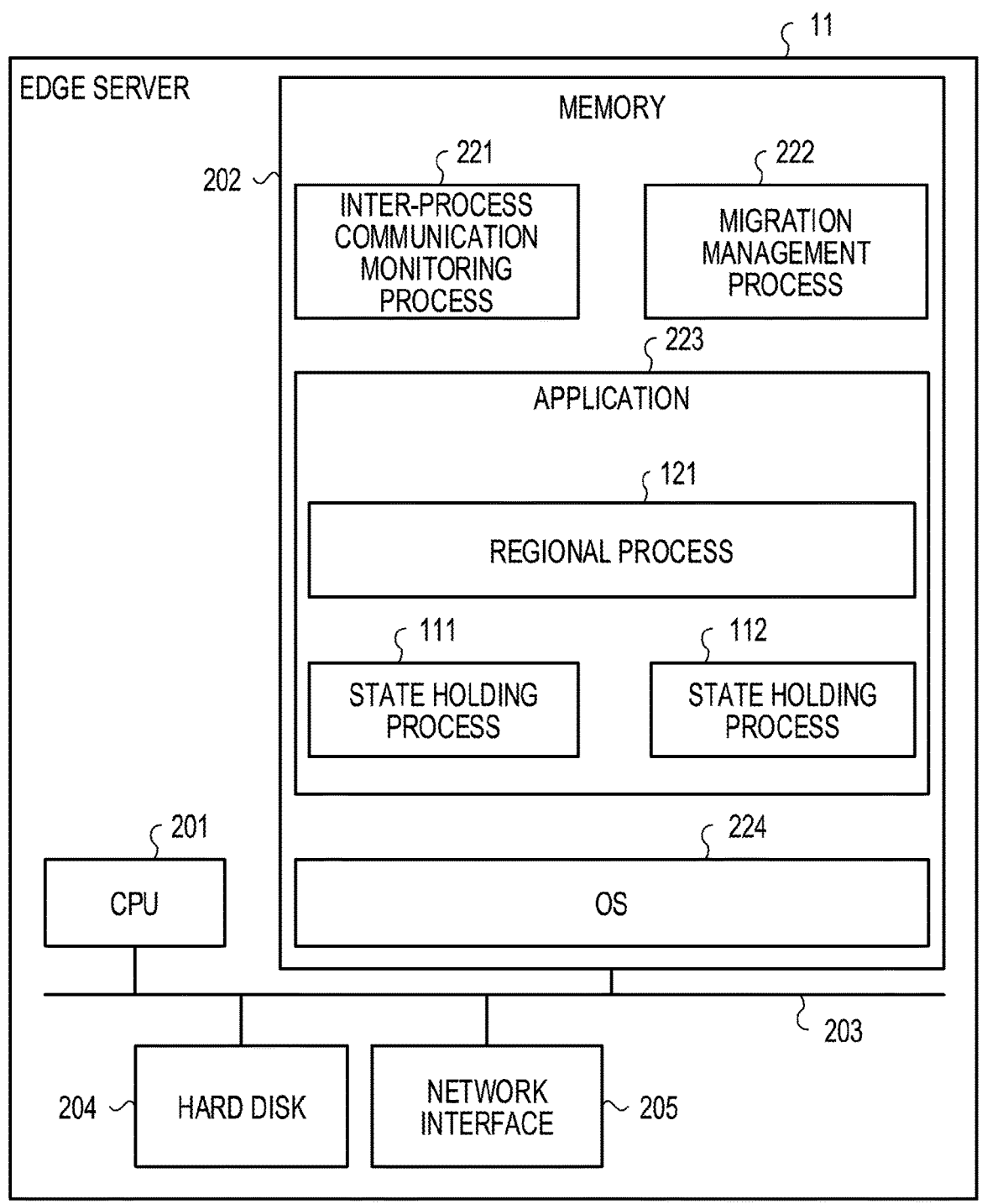
FIG. 3 is a hardware configuration diagram of the edge server according to the first embodiment.

FIG. 3 is a hardware configuration diagram of the edge server according to the first embodiment. As illustrated in FIG. 3, the edge server 11 includes a CPU (Central Processing Unit) 201, a memory 202, a bus 203, a hard disk 204, and a network interface 205. The CPU 201 is connected to the memory 202, the hard disk 204, and the network interface 205 via a bus 203.

The hard disk 204 stores various programs including programs which implement the functions of the state holding process execution unit 101, the regional process execution unit 102, the inter-process communication monitoring unit 103, and the migration management unit 104 illustrated in FIG. 2.

The CPU 201 reads the various programs including the programs which implement the functions of the state holding process execution unit 101, the regional process execution unit 102, the inter-process communication monitoring unit 103, and the migration management unit 104 from the hard disk 204. Then, the CPU 201 deploys the read programs on the memory 202 to generate various processes including an inter-process communication monitoring process 221, a migration management process 222, an application 223, and an OS 224. The application 223 includes state holding processes 111 and 112 and a regional process 121. The state holding processes 111 and 112 correspond to an example of a "first process". The regional process 121 corresponds to an example of a "second process".

In addition, as the application 223 is executed, the functions of the state holding process execution unit 101 and the regional process execution unit 102 illustrated in FIG. 2 are implemented. As the inter-process communication monitoring process 221 is executed, the function of the inter-process communication monitoring unit 103 illustrated in FIG. 2 is implemented.

Referring back to FIG. 2, the state holding process execution unit 101 acquires the information transmitted from the mobile stations 51 and 52 which are located in the cell 30 and communicate with the base station 21 via the base station 21. Then, the state holding process execution unit 101 acquires information indicating the state of the mobile station 51 using the information sent from the mobile station 51. Further, the state holding process execution unit 101 acquires information indicating the state of the mobile station 52 using the information sent from the mobile station 52. Then, the state holding process execution unit 101 generates individual information to be provided to each of the mobile stations 51 and 52, for example, by analyzing the acquired information. Then, the state holding process execution unit 101 transmits the generated information to each of the mobile stations 51 and 52 via the base station 21. Further, the state holding process execution unit 101 provides the information acquired from the mobile station and the generated information to the cloud 7 via the regional process execution unit 102 or the mobile core network 6.

In this manner, the process of generating and transmitting the individual information to be provided to the mobile station 51 or 52 using the information indicating the individual current state of the mobile station 51 or 52 corresponds to each of the state holding processes 111 and 112. That is, the state holding process 111 may be considered as a process of holding the current state of the mobile station 51 and the state holding process 112 may be considered as a process of holding the current state of the mobile station 52. Then, it may be considered that the state holding process execution unit 101 executes the state holding processes 111 and 112.

Further, the state holding process execution unit 101 communicates with the regional process execution unit 102. For example, the state holding process execution unit 101 transmits information on an area in which the mobile stations 51 and 52 are located, which is used for processing of the regional process execution unit 102 (to be described later), among the information transmitted from the mobile stations 51 and 52 and the information generated using this transmitted information, to the regional process execution unit 102. This state holding process executing unit 101 corresponds to an example of a "first execution unit".

The regional process execution unit 102 communicates with the state holding process execution unit 101. The regional process execution unit 102 acquires information on the area in which the mobile stations 51 and 52 are located, from the state holding process execution unit 101. Then, the regional process execution unit 102 uses the acquired information to generate information on the area covered by the cell 30 formed by the base station 21. Then, the regional process execution unit 102 transmits the generated information on the area covered by the cell 30 formed by the base station 21 to the mobile stations 51 and 52 via the base station 21.

In this manner, the process of generating and transmitting the information on the area covered by the cell 30 formed by the base station 21 using the information on the area in which the mobile stations 51 and 52 are located corresponds to the regional process 121. That is, it may be considered that the regional process execution unit 102 executes the regional process 121. The regional process 121 uses the information on the mobile stations 51 and 52, but does not use the information on the current state of each of the mobile stations 51 and 52. That is, the regional process execution unit 102 may execute the regional process 121 without holding the information indicating the current state of the mobile stations 51 and 52. Therefore, it may be considered that the regional process 121 is a process that does not hold the information indicating the current state of the mobile stations 51 and 52. This regional process execution unit 102 corresponds to an example of a "second execution unit".

It may be considered that the communication between the state holding process execution unit 101 and the regional process execution unit 102 is communication between the state holding process 111 or 112 and the regional process 121. That is, the communication between the state holding process execution unit 101 and the regional process execution unit 102 corresponds to inter-process communication.

Figure 4:
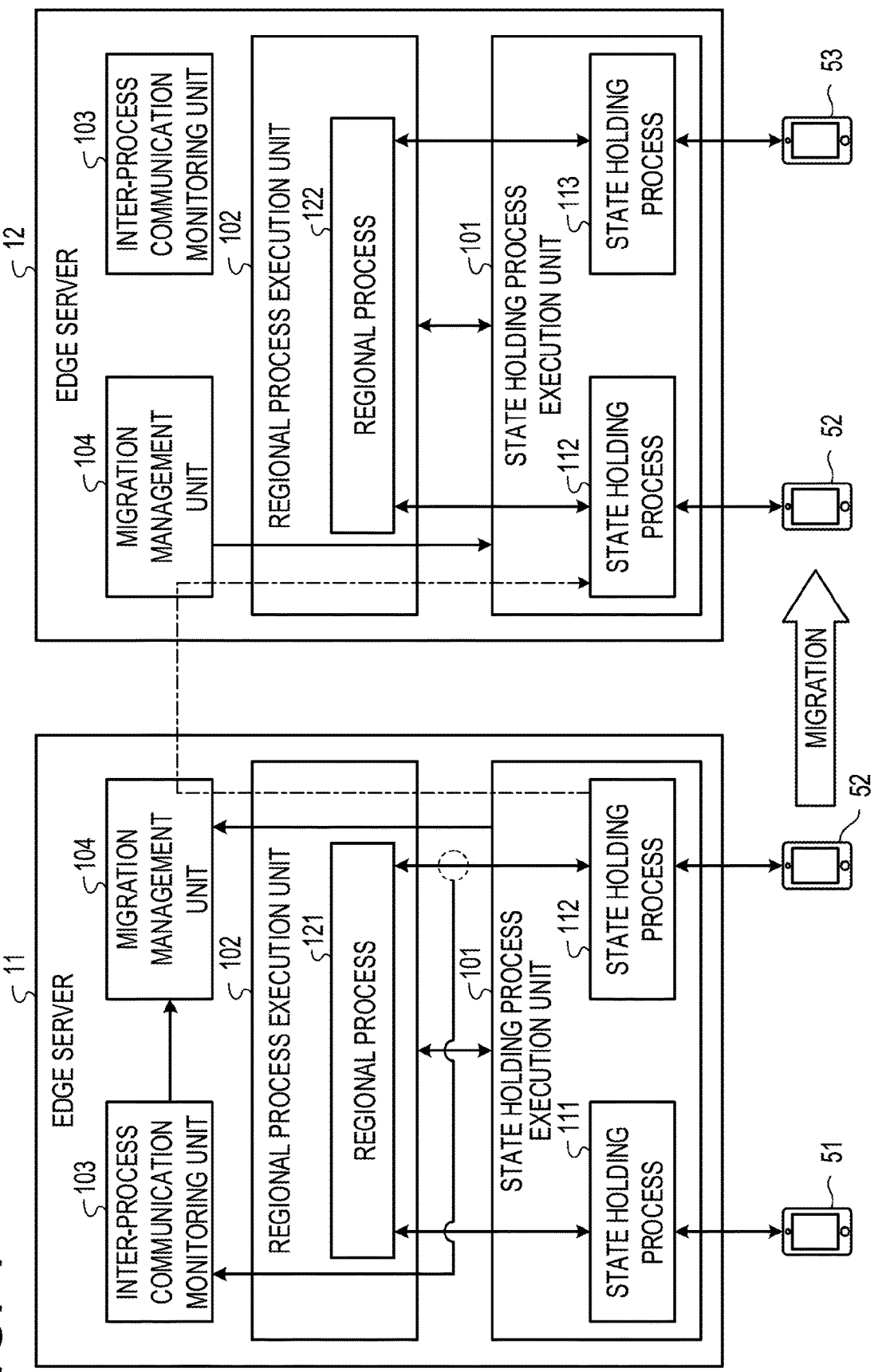
FIG. 4 is a view for explaining process migration according to the first embodiment.

As illustrated in FIG. 4, the inter-process communication monitoring unit 103 monitors the inter-process communication performed between the state holding process execution unit 101 and the regional process execution unit 102. FIG. 4 is a view for explaining process migration according to the first embodiment. In FIG. 4, inter-process communication monitoring is indicated by arrows that extend from a circle indicated by a broken line on a communication path between the state holding process execution unit 101 and the regional process execution unit 102. In addition, in this case, the state holding process execution unit 101 of the edge server 12 executes the state holding process 113 before the state holding process 112 is migrated. In addition, the regional process execution unit 102 of the edge server 12 executes the regional process 122.

The inter-process communication monitoring unit 103 has in advance a communication protocol which represents an indivisible operation in the inter-process communication performed between the state holding process execution unit 101 and the regional process execution unit 102. FIG. 5 is a view illustrating an example of a communication protocol. For example, the communication protocol 150 illustrated in FIG. 5 has information including messages which are arranged in the order of transmission/reception adopting a message representing a processing request and a response included in one indivisible operation as a block. Each of Atom #1 to Atom #3 represents a message included in one indivisible operation. For example, for Atom #1, when four messages of Put(A, *), Response(A, *), Put(B, *) and Response(B, *) are transmitted and received in this order, one indivisible operation is completed. Here, A, B, etc. are fixed parameters, and * represents a parameter of a variable.

Referring back to FIG. 4, the inter-process communication monitoring unit 103 monitors the inter-process communication and stores a communication message in the own storage area. Here, the inter-process communication between the regional process 121 and each of the state holding processes 111 and 112 is performed via the OS 224. Therefore, the inter-process communication monitoring process 221 may monitor the inter-process communication by monitoring a specific portion in the OS 224. This inter-process communication monitoring unit 103 corresponds to an example of a "detection unit".

Then, upon receiving an atomicity confirmation request from the migration management unit 104, the inter-process communication monitoring unit 103 reads the communication message from its own storage area. Then, the inter-process communication monitoring unit 103 compares the read communication message with the communication protocol 150. The inter-process communication monitoring unit 103 determines from the acquired communication message whether the current communication state of the inter-process communication is in the middle of any of the indivisible operations registered in the communication protocol 150.

When the acquired communication message and a message registered in the communication protocol 150 have the same message description and the same fixed parameter and have a value appropriate for the parameter of the variable, the inter-process communication monitoring unit 103 determines that these messages are the same. A message included in each indivisible operation registered in the communication protocol 150 corresponds to an example of "information for indicating communication processing".

For example, upon detecting that "Put(A, *)" is included in the acquired communication message, the inter-process communication monitoring unit 103 thereafter determines whether communication messages of "Response(A, *)", "Put(B, *)" and "Response(B, *)" have been transmitted. When these three communication messages are included, the inter-process communication monitoring unit 103 determines that the indivisible operation indicated by Atom #1 registered in the communication protocol 150 has been completed.

In this manner, the inter-process communication monitoring unit 103 determines whether the current state of the inter-process communication is in a state where atomicity is ensured, depending on whether there is an operation that has not been completed with the indivisible operation registered in the communication protocol 150. When the current state of the inter-process communication is in the state where atomicity is secured, the inter-process communication monitoring unit 103 outputs a notification of permission to migrate a process image to the migration management unit 104.

Next, the migration management unit 104 will be described with reference to FIGS. 2 to 4. The migration management unit 104 receives a handover request from the base station 21. Upon receiving the handover request, the migration management unit 104 outputs an atomicity confirmation request to the inter-process communication monitoring unit 103. Thereafter, the migration management unit 104 acquires the process image migration permission notification from the inter-process communication monitoring unit 103.

Upon receiving the process image migration permission notification, the migration management unit 104 stops the operation of the state holding process 112 operating in the state holding process execution unit 101. Then, the migration management unit 104 acquires a process image of the state holding process 112 from the state holding process execution unit 101. In other words, the migration management unit 104 causes the memory 202 illustrated in FIG. 3 to output a dump of the process image of the status holding process 112 and acquires the process image. Thereafter, the migration management unit 104 generates a process image file including the acquired process image. Then, the migration management unit 104 transmits the generated process image file to the edge server 12.

When the mobile station 52 is migrated from the cell 30 to the cell 40, the migration management unit 104 of the edge server 12 illustrated in FIG. 4 receives the process image file transmitted by the migration management unit 104 of the edge server 11. Then, the migration management unit 104 of the edge server 12 acquires the process image from the process image file and restores the acquired process image in the memory 202. Thereafter, the migration management unit 104 of the edge server 12 instructs the state holding process execution unit 101 and the regional process execution unit 102 to perform the inter-process communication between the regional process 122 and the state holding process 112 and restores the inter-process communication. Thus, as indicated by an alternate long and short dashed line of FIG. 4, in accordance with the migration of the mobile station 52, the state holding process 112 is migrated from the edge server 11 to the edge server 12.

Figure 6:
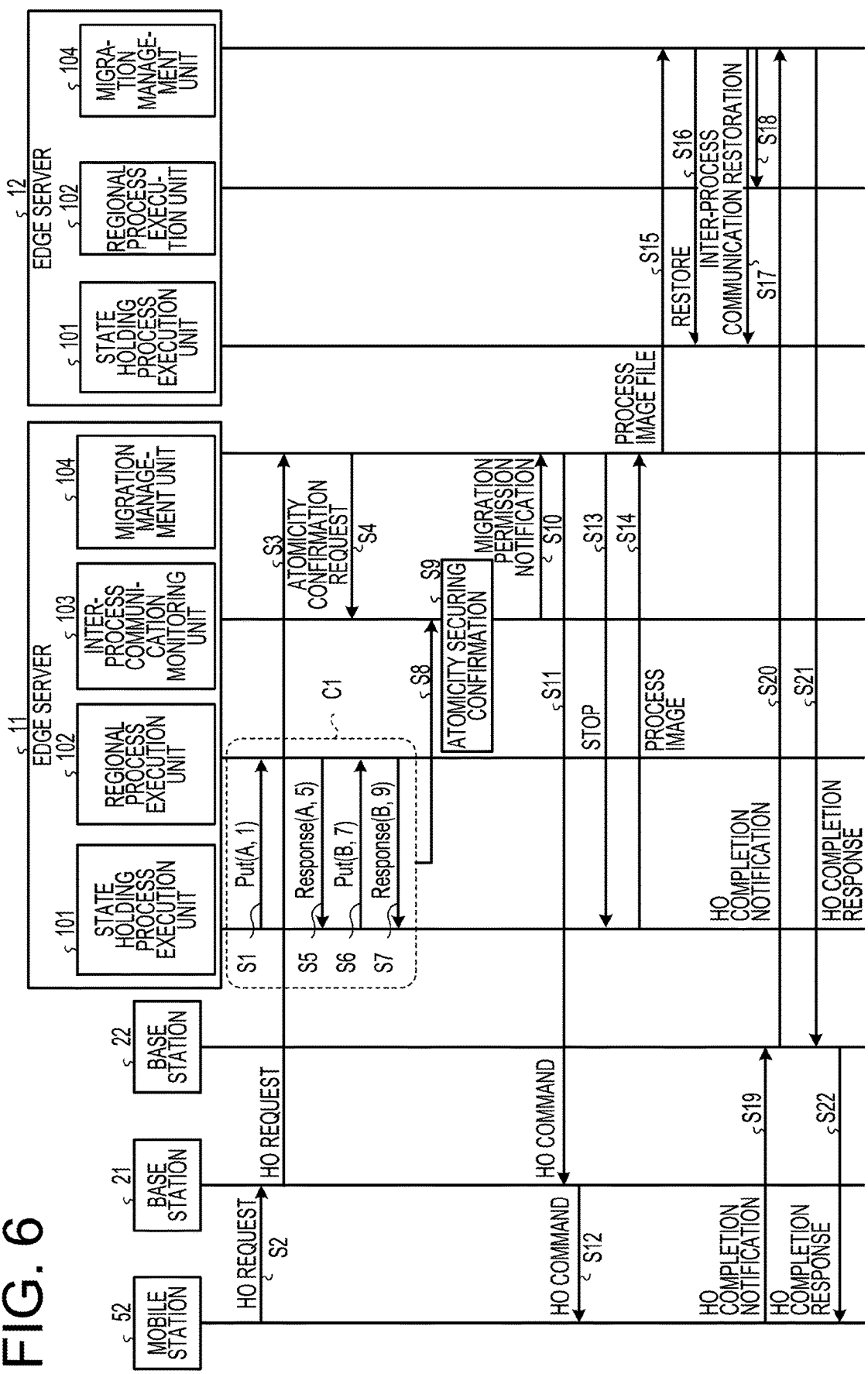
FIG. 6 is a sequence diagram of process migration processing in a communication system according to the first embodiment.

Next, a flow of process migration processing in the communication system 100 according to the present embodiment will be described with reference to FIG. 6. FIG. 6 is a sequence diagram of process migration processing in the communication system according to the first embodiment. In FIG. 6, the vertical axis represents the operation of each unit described on the upper portion of the vertical axis toward the paper surface. In addition, the vertical axis in FIG. 6 indicates that the time elapses as going downward toward the paper surface. In FIG. 6, handover is abbreviated as "HO".

Here, before a handover request of the mobile station 52 occurs, the state holding process execution unit 101 transmits "Put (A, 1)" included in an indivisible operation C1 to the regional process execution unit 102 (operation S1).

As the mobile station 52 migrates from the cell 30 to the cell 40, the mobile station 52 transmits the handover request to the base station 21 (operation S2).

The base station 21 receives the handover request from the mobile station 52. Then, the base station 21 transmits the handover request to the migration management unit 104 of the edge server 11 (operation S3).

The migration management unit 104 of the edge server 11 receives the handover request from the base station 21. Then, the migration management unit 104 of the edge server 11 outputs an atomicity confirmation request to the inter-process communication monitoring unit 103 of the edge server 11 (operation S4). At this time point, the state holding process execution unit 101 and the regional process execution unit 102 perform the invisible operation C1. Therefore, the inter-process communication monitoring unit 103 of the edge server 11 acquires a communication message in the inter-process communication, compares the acquired communication message with the communication protocol 150, and waits until completion of the indivisible operation C1.

Meanwhile, the regional process execution unit 102 of the edge server 11 transmits "Response(A, 5)" included in the indivisible operation C1 to the state holding process execution unit 101 (operation S5). Next, the state holding process execution unit 101 of the edge server 11 transmits "Put(B, 7)" included in the indivisible operation C1 to the regional process execution unit 102 (operation S6). Next, the regional process execution unit 102 of the edge server 11 transmits "Response(B, 9)" included in the indivisible operation C1 to the state holding process execution unit 101 (operation S7).

The inter-process communication monitoring unit 103 of the edge server 11 acquires a communication message to be transmitted and received in the operations S1 and S5 to S7 executed with the indivisible operation C1 (operation S8).

Then, when all the communication messages transmitted and received in the operations S1 and S5 to S7 are acquired, the inter-process communication monitoring unit 103 of the edge server 11 determines that the indivisible operation C1 has been completed, and confirms the atomicity securing (operation S9).

Thereafter, the inter-process communication monitoring unit 103 of the edge server 11 outputs a migration permission notification of the state holding process 112 to the migration management unit 104 of the edge server 11 (operation S10).

The migration management unit 104 of the edge server 11 receives an input of the migration permission notification of the state holding process 112 from the inter-process communication monitoring unit 103 of the edge server 11. Then, the migration management unit 104 of the edge server 11 transmits a handover command to the base station 21 (operation S11).

The base station 21 receives the handover command from the migration management unit 104 of the edge server 11. Then, the base station 21 transmits the handover command to the mobile station 52 (operation S12).

The mobile station 52 receives the handover command from the base station 21. Then, the mobile station 52 starts the handover and executes switching of radio waves and synchronization of radio wave with the base station 22 as a handover destination. Meanwhile, the migration management unit 104 of the edge server 11 instructs the state holding process execution unit 101 to stop the state holding process 112, and stops the state holding process 112 (operation S13).

Next, the migration management unit 104 of the edge server 11 acquires a process image from the state holding process execution unit 101 (operation S14). Specifically, the migration management unit 104 causes the memory 202 to output a dump of the process image of the state holding process 112, thereby acquiring the process image. Then, the migration management unit 104 of the edge server 11 generates a process image file including the process image.

Next, the migration management unit 104 of the edge server 11 transmits the generated process image file to the migration management unit 104 of the edge server 12 (operation S15).

The migration management unit 104 of the edge server 12 receives the process image file from the migration management unit 104 of the edge server 11. Then, the migration management unit 104 of the edge server 12 restores the state holding process 112 in the memory 202 (operation S16).

Thereafter, the migration management unit 104 of the edge server 12 causes the state holding process execution unit 101 of the edge server 12 to start executing the state holding process 112. Then, the migration management unit 104 of the edge server 12 restores the inter-process communication between the state holding process 112 and the regional process 122 between the state holding process execution unit 101 and the regional process execution unit 102 (operation S17 and S18).

Upon completion of the handover process, the mobile station 52 outputs a handover completion notification to the base station 22 (operation S19).

The base station 22 receives the handover completion notification from the mobile station 52. Then, the base station 22 transmits the handover completion notification to the migration management unit 104 of the edge server 12 (operation S20).

The migration management unit 104 of the edge server 12 receives the handover completion notification from the base station 22. Then, when the restoration of the inter-process communication between the state holding process 112 and the regional process 122 has been completed, the migration management unit 104 of the edge server 12 transmits a handover completion response to the base station 22 (operation S21).

The base station 22 receives the handover completion response from the migration management unit 104 of the edge server 12. Then, the base station 22 transmits the handover completion response to the mobile station 52 (operation S22).

The mobile station 52 receives the handover completion response. As a result, the mobile station 52 may transmit information to the state holding process execution unit 101 and the regional process execution unit 102 of the edge server 12 and may receive a service.

Here, FIG. 6 illustrates the case where the migration management unit 104 receives the handover completion notification after completing the restoration of the inter-process communication between the state holding process 112 and the regional process 122. However, it is also conceivable that the migration management unit 104 receives the handover completion notification before completing the restoration of the inter-process communication between the state holding process 112 and the regional process 122.

In that case, the migration management unit 104 waits for completion of the restoration of the inter-process communication between the state holding process 112 and the regional process 122, and thereafter transmits the handover completion response to the base station 22. Even in this case, depending on the delay requirement of the application 223, there is a time margin until the edge server 12 actually starts providing a service to the mobile station 52. Therefore, the migration management unit 104 may use the time margin to adjust the time until outputting the handover completion response after receiving the handover completion notification. In addition, since the cell 30 and the cell 40 overlap with each other, the migration management unit 104 may use the period during which the mobile station 52 is located in the overlapping area to adjust the timing of switching a service provider.

Figure 7:
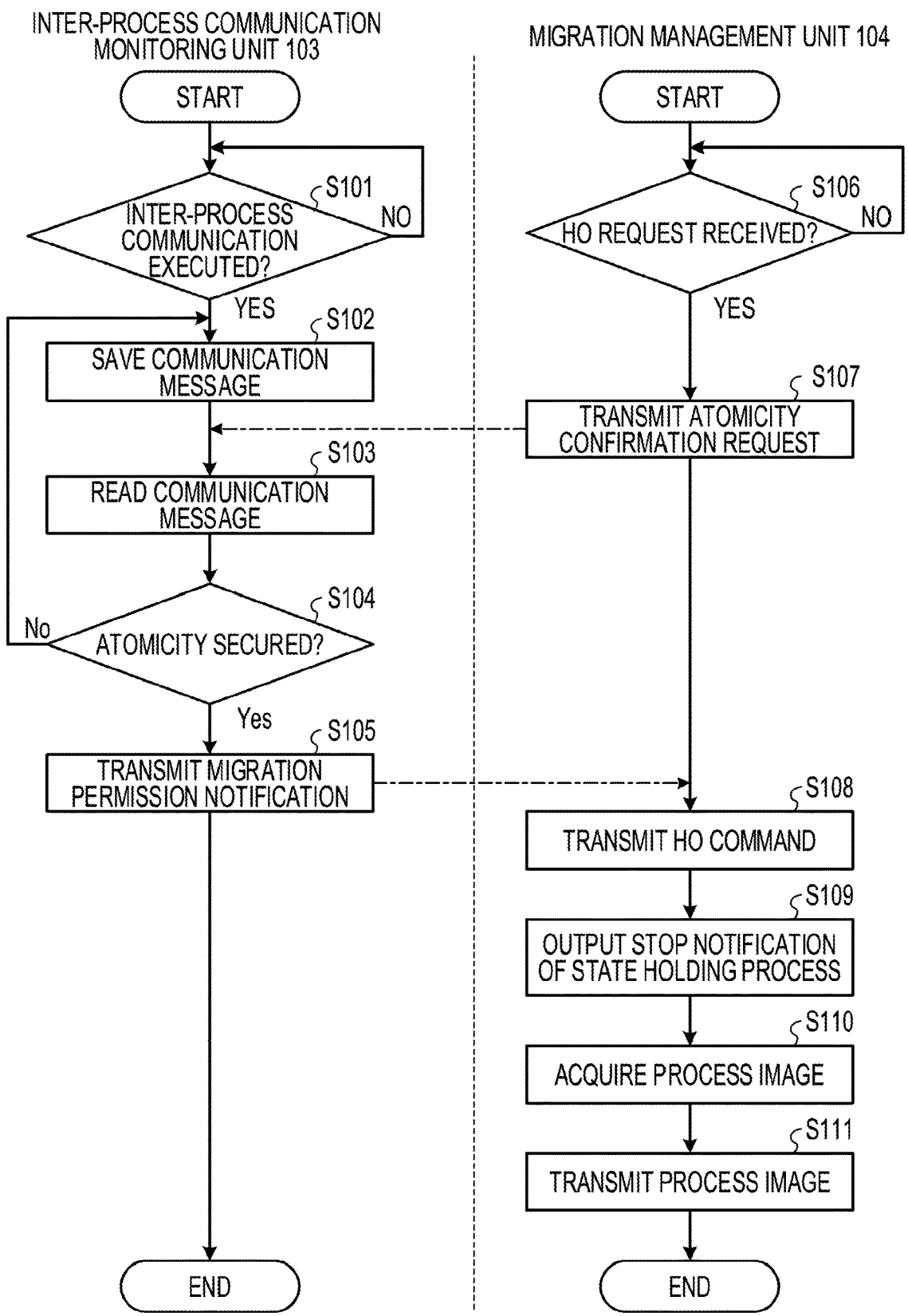
FIG. 7 is a flowchart of atomicity securing processing by the edge server according to the first embodiment.

Next, a flow of atomicity securing processing by the edge server 11 according to the present embodiment will be described with reference to FIG. 7. FIG. 7 is a flow chart of atomicity securing processing by the edge server according to the first embodiment. In FIG. 7, the left side of a broken line toward the paper surface indicates a flow of process by the inter-process communication monitoring unit 103 and the right side of the broken line indicates a flow of process by the migration management unit 104. An arrow indicated by an alternate long and short dashed line connecting flow charts indicates communication between the inter-process communication monitoring unit 103 and the migration management unit 104.

The inter-process communication monitoring unit 103 determines whether inter-process communication has been executed (operation S101). When it is determined that the inter-process communication has not been executed ("No" in operation S101), the inter-process communication monitoring unit 103 waits until the inter-process communication is executed.

In the meantime, when it is determined that the inter-process communication has been executed ("Yes" in operation S101), the inter-process communication monitoring unit 103 saves a communication message transmitted and received by the inter-process communication (operation S102).

Thereafter, upon receiving an atomicity confirmation request from the migration management unit 104, the inter-process communication monitoring unit 103 reads the communication message from the own storage area (operation S103).

Then, the inter-process communication monitoring unit 103 compares the read communication message with the communication protocol 150 to determine whether atomicity has been secured (operation S104). When it is determined that the atomicity has not been secured ("No" in operation S104), the inter-process communication monitoring unit 103 returns to the operation S102.

In the meantime, when it is determined that the atomicity has been secured ("Yes" in operation S104), the inter-process communication monitoring unit 103 transmits a migration permission notification to the migration management unit 104 (operation S105).

Meanwhile, the migration management unit 104 determines whether a handover request has been received (operation S106). When it is determined that the handover request has not been received ("No" in operation S106), the migration management unit 104 waits until the handover request is received.

In the meantime, when it is determined that the handover request has been received ("Yes" in operation S106), the migration management unit 104 transmits an atomicity confirmation request to the inter-process communication monitoring unit 103 (operation S107).

Thereafter, upon receiving a migration permission notification from the inter-process communication monitoring unit 103, the migration management unit 104 transmits a handover command (operation S108).

Next, the migration management unit 104 outputs a notification of stop of the state holding process 112 to the state holding process execution unit 101 (operation S109).

Next, the migration management unit 104 causes the memory 202 to output a dump of the state holding process 112, and acquires a process image (operation S110).

Thereafter, the migration management unit 104 transmits the process image of the state holding process 112 output from the memory 202 (operation S111).

Figure 8:
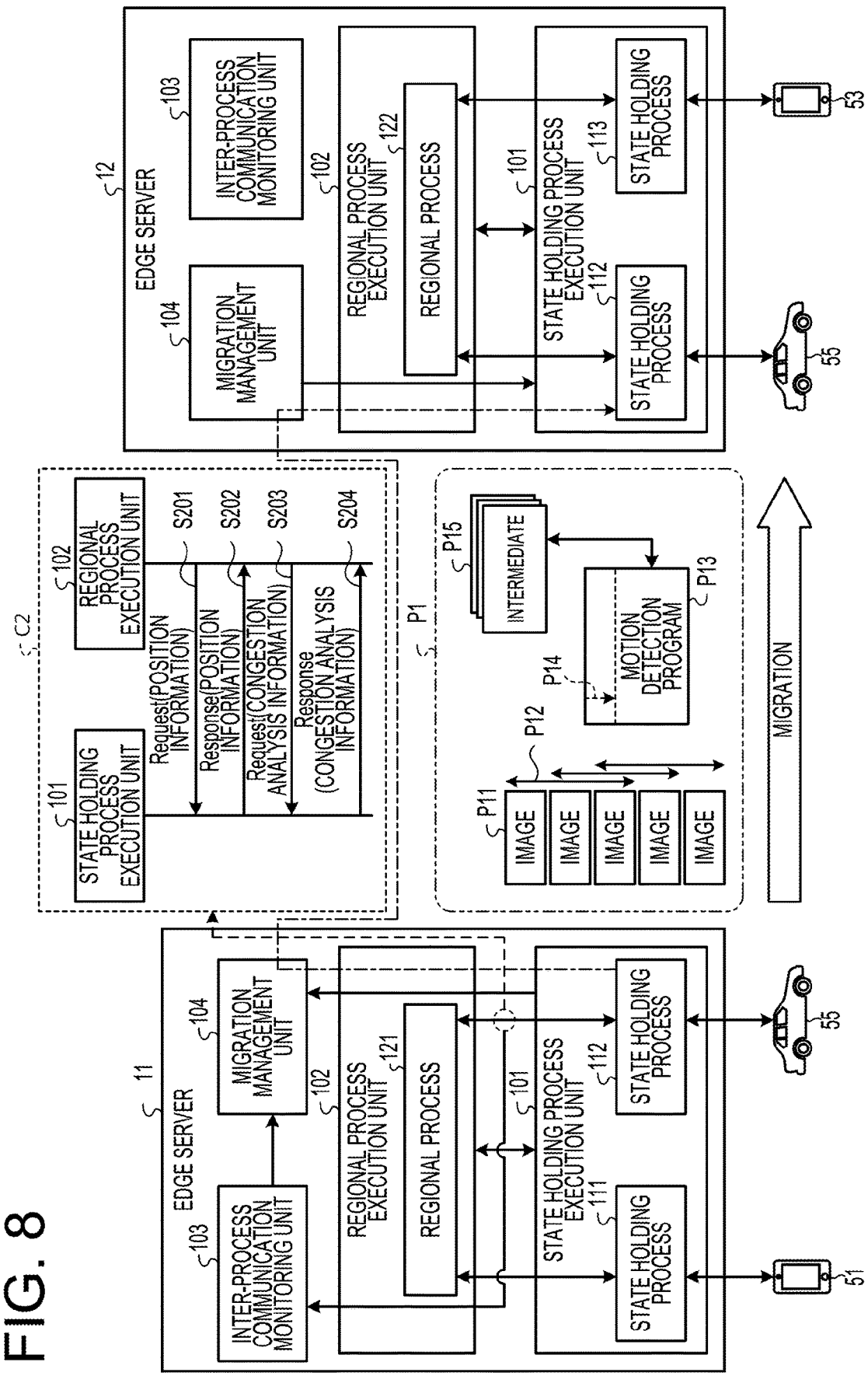
FIG. 8 is a view illustrating an example of an application for driving assistance of a vehicle.

Next, an example of an application that provides an edge service will be described with reference to FIG. 8. FIG. 8 is a view illustrating an example of an application for driving assistance of a vehicle.

The state holding process execution unit 101 executes the state holding processes 111 and 112 which will be described below. In this case, the state holding processes 111 and 112 perform a process P1 which provides a service for safe driving assistance of the vehicle. In the following, the state holding process 112 will be described as an example.

The state holding process 112 acquires a transmitted continuous image P11 captured by a camera provided in the vehicle from an in-vehicle terminal 55 mounted on the vehicle. Then, the state holding process 112 acquires a continuous image P12 that is a collection of plural of images P11 included in a frame range used for motion detection, from the image P11.

Next, the state holding process 112 performs motion detection processing on the continuous image P12 using a motion detection program P13 to generate intermediate data P15 which is an intermediate processing result, while detecting motion of persons and vehicles around the vehicle on which the in-vehicle terminal 55 is mounted. The motion detection program P13 is a program configured to detect the presence/absence of a moving object and the directionality of the motion by sliding and referring to, for example, plural images P11. At this time, the state holding process 112 uses a program counter P14 to hold information on how far the motion detection program P13 has been executed.

The state holding process 112 feeds back the result of the motion detection to the in-vehicle terminal 55. The vehicle equipped with the in-vehicle terminal 55 may use the feedback result to perform safe driving assistance such as automatic braking.

Further, the state holding process 112 uses the image P11 and other information such as vehicle traveling information to analyze the state of congestion of a route on which the vehicle equipped with the in-vehicle terminal 55 travels. Then, in response to a request from the regional process 121, the state holding process 112 transmits the position information of the vehicle equipped with the in-vehicle terminal 55 and the position congestion analysis information which is a result of the analysis.

In the meantime, the regional process execution unit 102 executes the regional process 121 to be described below. In this case, the regional process 121 performs statistical processing of congestion information within the range of the cell 30.

For example, the regional process 121 acquires, from the state holding process 112, the position information of the vehicle equipped with the in-vehicle terminal 55 and the position congestion analysis information which is a result of the analysis. In this manner, the regional process 121 collects the congestion analysis information at each position of the cell 30 together with the position information. Then, the regional process 121 uses the collected information to statistically process the congestion information of an area included in the cell 30. Thereafter, the regional process 121 performs transmission of the statistical processing result to the cloud 7 in FIG. 1.

The regional process execution unit 102 performs communication represented by an indivisible operation C2 with the state holding process execution unit 101 in order to acquire, from the state holding process execution unit 101, the position information of the vehicle equipped with the in-vehicle terminal 55 and the position congestion analysis information which is a result of the analysis.

That is, the regional process execution unit 102 transmits "Request", which is a transmission request for the position information of the in-vehicle terminal 55 (position information), to the state holding process execution unit 101 (operation S201). Upon receiving the "Request" (position information), the state holding process execution unit 101 transmits "Response" which transmits the position information of the in-vehicle terminal 55 (position information) to the regional process execution unit 102 (operation S202).

Upon receiving the "Response" (position information), the regional process execution unit 102 transmits "Request", which is a transmission request for the congestion analysis information (congestion analysis information), to the state holding process execution unit 101 (operation S203). Upon receiving the "Request" (congestion analysis information), the state holding process execution unit 101 transmits "Response" which transmits the position congestion analysis information the in-vehicle terminal 55 (congestion analysis information) to the regional process execution unit 102 (operation S204).

In this way, by completing two sets of processing, that is, the transmission/reception of the position information and the transmission/reception of the congestion analysis information, the atomicity of the inter-process communication between the state holding process 112 and the regional process 121 is secured. For example, when the vehicle moves and the in-vehicle terminal 55 moves to the cell 40 after transmitting and receiving the position information, since the regional process 122 of the edge server 12 does not have the position information of the in-vehicle terminal 55 although the regional process 122 of the edge server 12 may acquire the position congestion analysis information of the in-vehicle terminal 55, it is difficult to continue the statistical processing of congestion information.

Therefore, the inter-process communication monitoring unit 103 confirms the completion of the indivisible operation C2 and issues a migration permission notification. Then, upon receiving the migration permission notification, the migration management unit 104 migrates the state holding process 112. As a result, it is possible to suppress the state holding process 112 from migrating to the edge server 12 in the middle of the indivisible operation C2 and to maintain the continuity of the statistical processing of the congestion information.

Figure 9:
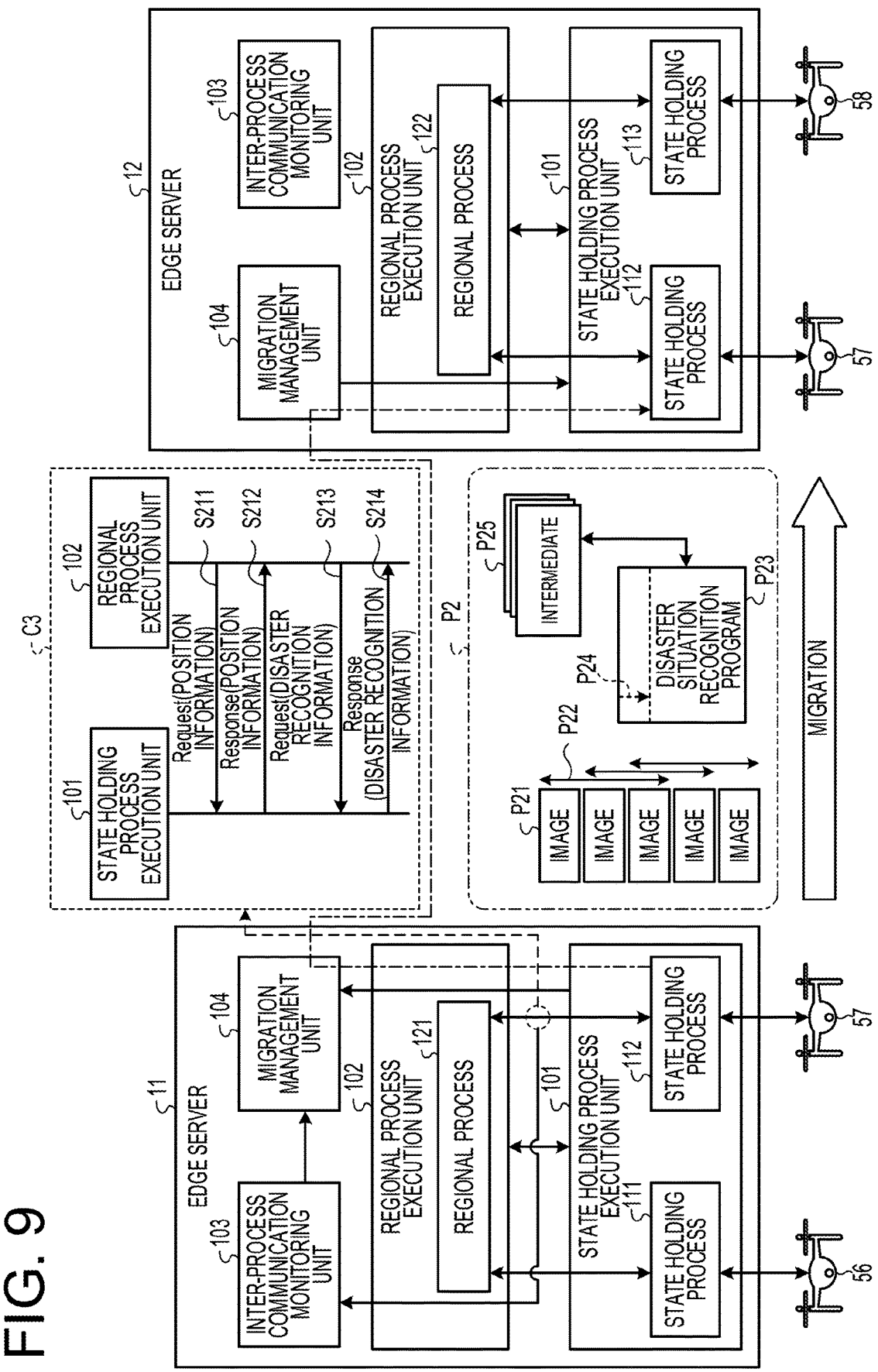
FIG. 9 is a view illustrating an example of an application which grasps a disaster situation by a drone.

Next, another example of the application 223 that provides the cloud service will be described with reference to FIG. 9. FIG. 9 is a view illustrating an example of an application which grasps a disaster situation by a drone. A drone generally refers to an unmanned multi-copter that has three or more rotor blades and may be operated remotely.

The state holding process execution unit 101 executes the state holding processes 111 and 112 to be described below. In this case, the state holding processes 111 and 112 perform a process P2 of providing a service that recognizes a disaster situation and continuously outputs a result of the recognition. For the recognition of the disaster situation, for example, "victim detection" which detects the existence of a victim, "crowd action detection" which detects that the crowd is panicking, "river situation detection" which detects a collapsed part of an embankment, etc. are conceivable. In the following, the state holding process 112 will be described as an example.

The state holding process 112 acquires a continuous image P21 captured by a camera provided in a drone 57 from the drone 57. Then, the state holding process 112 acquires a continuous image P22 that is a collection of plural images P21 included in a frame range used for motion detection in the image P21.

Next, the state holding process 112 uses a disaster situation recognition program P23 to perform motion detection processing on the continuous image P22 and generate intermediate data P25, which is an intermediate processing result, while recognizing the disaster situation around the drone 57. At this time, the state holding process 112 uses a program counter P24 to hold information on how far the disaster situation recognition program P23 has been executed.

The state holding process 112 outputs the result of the disaster situation recognition as information of an area where the drone 57 is located. A victim in the area where the drone 57 is located may efficiently cope with disasters by confirming the result of disaster situation recognition. In this manner, by performing automatic detection, it is possible to grasp the disaster situation more efficiently than in a case where a large number of images are monitored by persons by human wave tactics.

Further, in accordance with a request from the regional process 121, the state holding process 112 transmits the position information of the drone 57 and the result of the disaster situation recognition related to the position.

Meanwhile, the regional process execution unit 102 executes the regional process 121 to be described below. In this case, the regional process 121 aggregates the results of disaster situation recognition within the range of the cell 30.

For example, the regional process 121 acquires, from the state holding process 112, the position information of the drone 57 and the result of the disaster situation recognition related to the position. Then, the regional process 121 uses the information acquired from each position of the cell 30 to determine a countermeasure point. Thereafter, the regional process 121 adds, for example, priorities to the countermeasure point of the area included in the cell 30 and displays, for example, the priorities on a map. The disaster countermeasure headquarter in each area picks up and refers to an image of a point to be noticed according to the priority of the displayed point to instruct a countermeasure. In this case as well, it is possible to grasp the disaster situation more efficiently than in a case where a large number of images are monitored by persons by human wave tactics. Here, the countermeasure includes, for example, intensive introduction of drones 56 to 58 to a district in a specific area, and an instruction to move drones 56 and 57 to another responsible area for dispatching the drones 56 to 58.

The regional process execution unit 102 performs a communication represented by an indivisible operation C3 with the state holding process execution unit 101 in order to acquire, from the state holding process execution unit 101, the position information of the drone 57 and the result of the disaster situation recognition related to the position.

That is, the regional process execution unit 102 transmits "Request", which is a transmission request for the position information of the drone 57 (position information), to the state holding process execution unit 101 (operation S211). Upon receiving the "Request" (position information), the state holding process execution unit 101 transmits "Response" which transmits the position information of the drone 57 (position information) to the regional process execution unit 102 (operation S212).

Upon receiving the "Response" (position information), the regional process execution unit 102 transmits "Request", which is a transmission request for a result of the disaster situation recognition (disaster recognition information), to the state holding process execution unit 101 (operation S213). Upon receiving the "Request" (disaster recognition information), the state holding process execution unit 101 transmits "Response" which transmits the result of the disaster situation recognition at the position of the drone 57 (disaster recognition information) to the regional process execution unit 102 (operation S214).

In this way, by completing two sets of processing, that is, the transmission/reception of the position information and the transmission/reception of the disaster recognition information, the atomicity of the inter-process communication between the state holding process 112 and the regional process 121 is secured. Therefore, the inter-process communication monitoring unit 103 confirms the completion of the indivisible operation C3 and issues a migration permission notification. Then, upon receiving the migration permission notification, the migration management unit 104 migrates the state holding process 112. As a result, it is possible to suppress the state holding process 112 from migrating to the edge server 12 in the middle of the indivisible operation C3 and to maintain the continuity of the intensive processing of the disaster recognition information.

As described above, the communication system and the edge server according to the present embodiment move the state holding process to another edge server after the indivisible operation in the inter-process communication is completed. This makes it possible to migrate the state holding process at the timing of ensuring the atomicity of the inter-process communication, thereby maintaining the continuity of service provision and securing the system stability.

Second Embodiment

Figure 10:
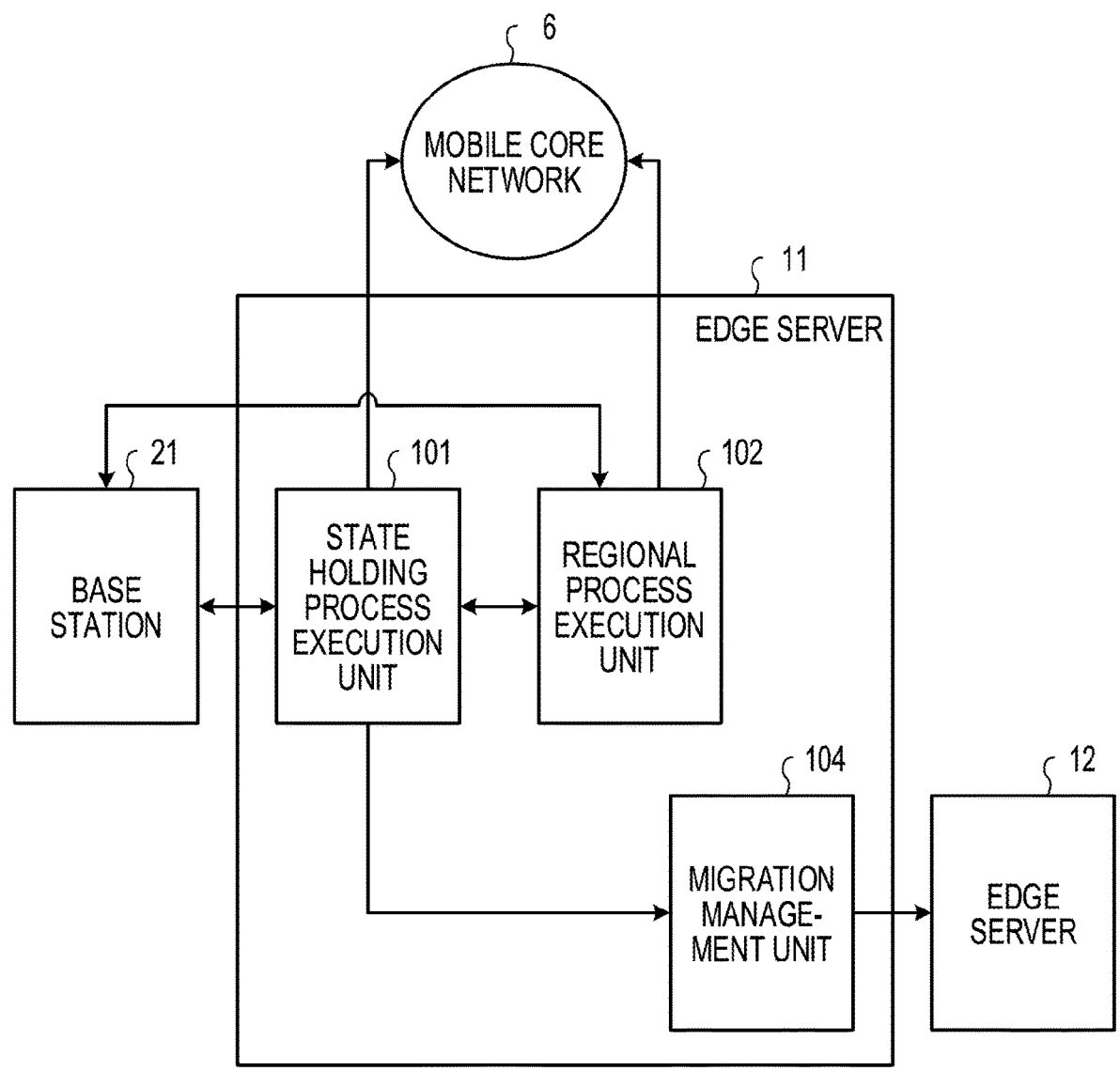
FIG. 10 is a block diagram of an edge server according to a second embodiment.

FIG. 10 is a block diagram of an edge server according to a second embodiment. The edge server 11 according to the present embodiment is different from that of the first embodiment in that the state holding process execution unit 101 makes a determination on atomicity securing. In the following description, explanation of the operations of the same units as the first embodiment will not be repeated.

The state holding process execution unit 101 according to the present embodiment has a communication protocol 150. The state holding process execution unit 101 confirms a communication message in communication with the regional process execution unit 102. Then, the state holding process execution unit 101 uses the information of the communication message exchanged with the regional process execution unit 102 to determine whether the current communication state of the inter-process communication is in the middle of any of the indivisible operations registered in the communication protocol 150.

When it is determined that the current communication state of the inter-process communication is not in the middle of any of the indivisible operations registered in the communication protocol 150, the state holding process execution unit 101 outputs a migration permission notification to the migration management unit 104.

Figure 11:
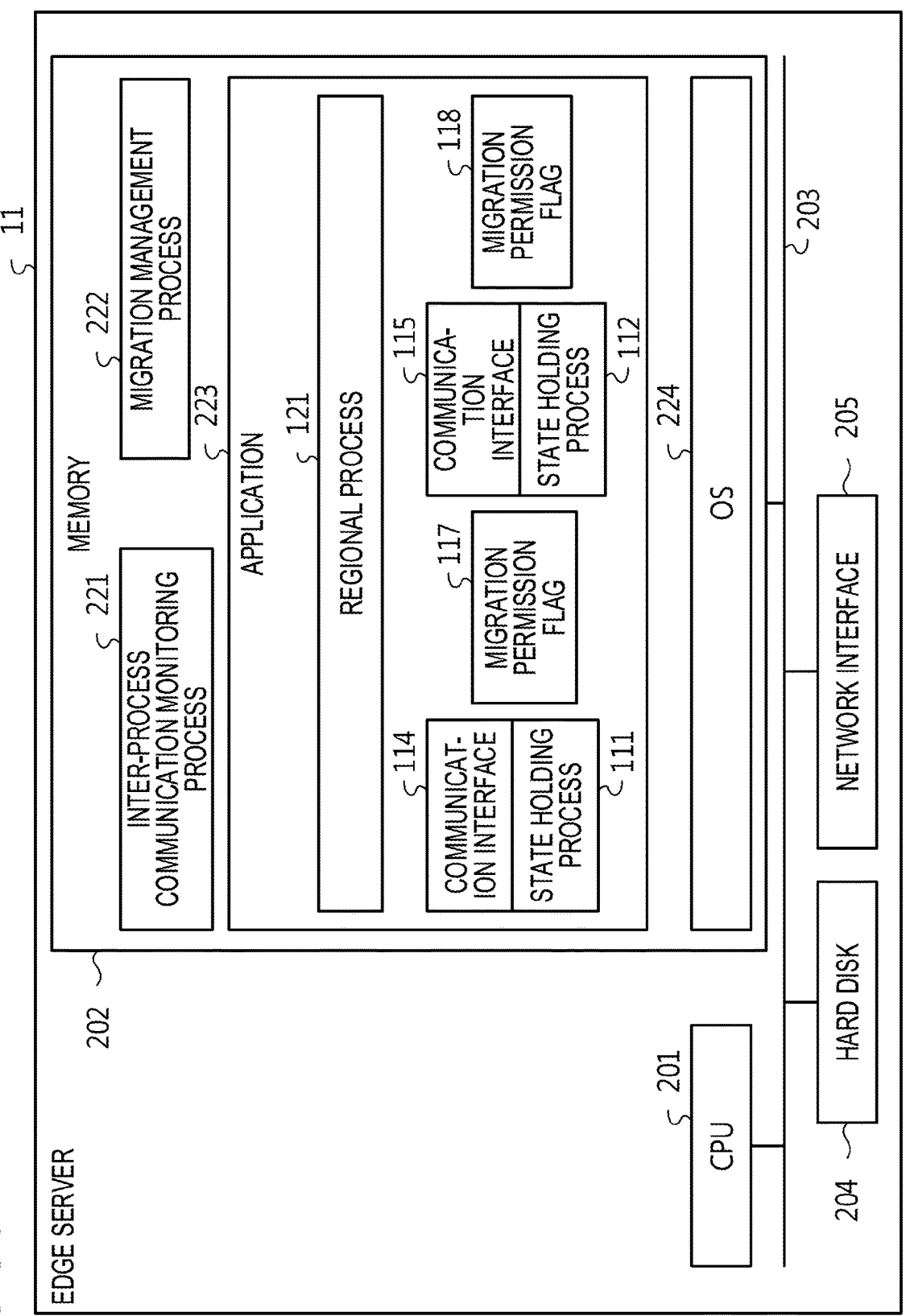
FIG. 11 is a hardware configuration diagram of the edge server according to the second embodiment.
Figure 12:
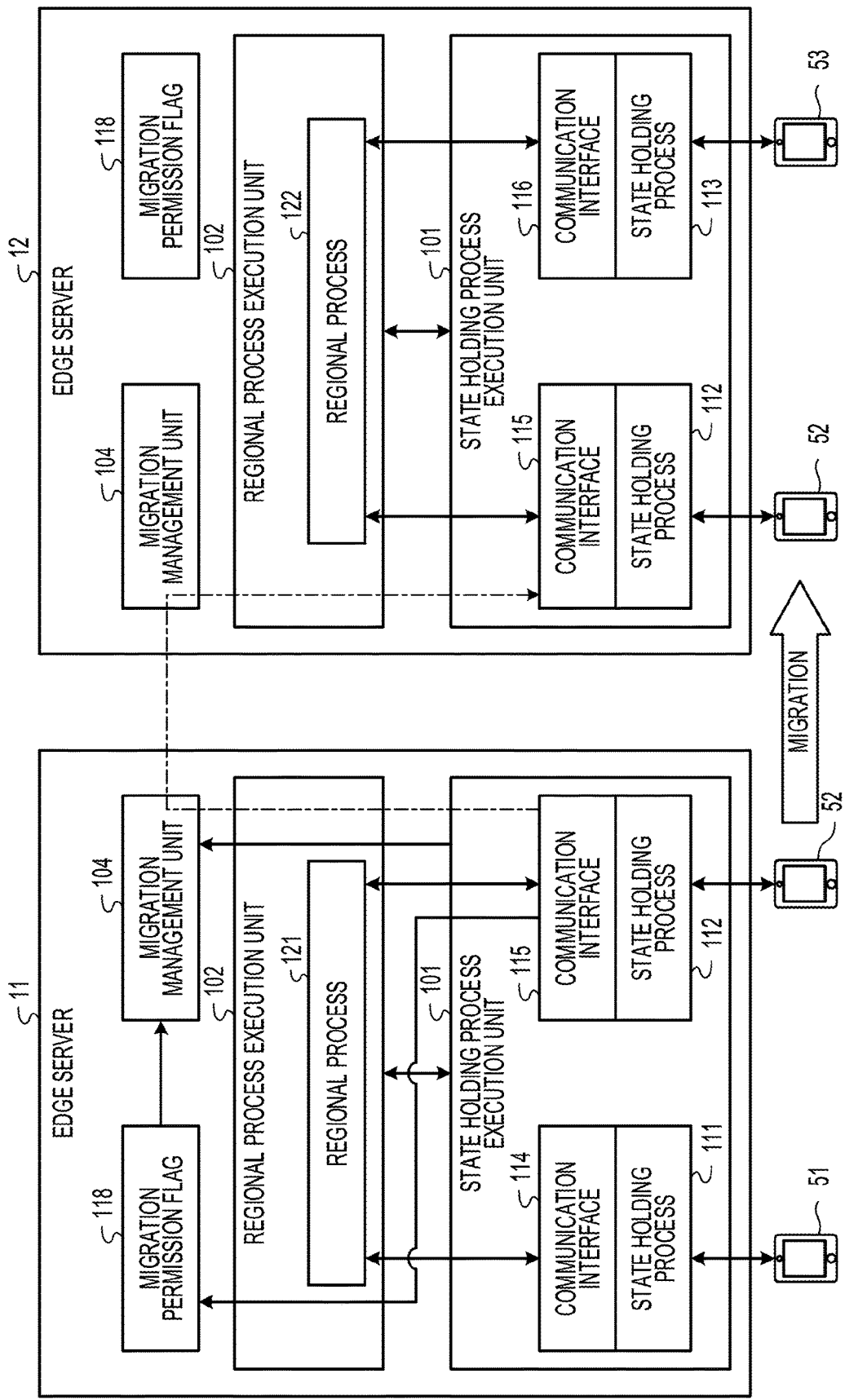
FIG. 12 is a diagram for explaining process migration according to the second embodiment.

Here, details of the monitoring of the communication state by the state holding process execution unit 101 will be described with reference to FIGS. 11 and 12. FIG. 11 is a hardware configuration diagram of an edge server according to the second embodiment. FIG. 12 is a view for explaining process migration according to the second embodiment.

As illustrated in FIG. 11, in the edge server 11 according to the present embodiment, the application 223 deployed on the memory by the CPU 201 has communication interfaces 114 and 115 coupled to the state holding processes 111 and 112, respectively. In addition, the application 223 has migration permission flags 117 and 118. The migration permission flags 117 and 118 are generated corresponding to the number of state holding processes 111 and 112.

For example, the communication interface 115 is an interface for data transmission/reception when the state holding process execution unit 101 performs the inter-process communication between the state holding process 112 and the regional process 121. That is, it may be said that the state holding process executing unit 101 operates the communication interfaces 114 and 115. The state holding process execution unit 101 causes the state holding process 112 and the communication interface 115 to execute the following process.

The state holding process 112 transmits a message to the regional process 121 via the communication interface 115.

For example, the communication interface 115 performs an encoding process on a communication message according to the inter-process communication unit used. There are plural kinds of inter-process communication units by the OS 224.

Then, the communication interface 115 compares the transmission/reception pattern of the communication message of the inter-process communication with a message included in the indivisible operation registered in the communication protocol 150. When the transmission/reception pattern of the communication message of the inter-process communication matches the message included in the indivisible operation registered in the communication protocol 150, the communication interface 115 determines that the atomicity is secured.

When the atomicity is secured, the communication interface 115 sets the migration permission flag 118. In addition, after the atomicity is secured, when the communication message is newly transmitted and received in the inter-process communication, and transition is made to a state in which the atomicity is not secured, the communication interface 115 unsets the migration permission flag 118. In FIG. 12, the migration permission flag 117 is omitted for convenience of explanation. This communication interface 115 corresponds to an example of a "communication interface unit".

In this case, the regional process execution unit 102 of the edge server 12 uses the communication interface 116 coupled to the state holding process 113 to communicate with the regional process execution unit 102.

Upon receiving a handover request, the migration management unit 104 migrates the state holding process 112 when the migration permission flag 118 is set. In the meantime, when the migration permission flag 118 is not set, the migration management unit 104 suspends the migration of the state holding process 112 until the migration permission flag 118 is set.

Figure 13:
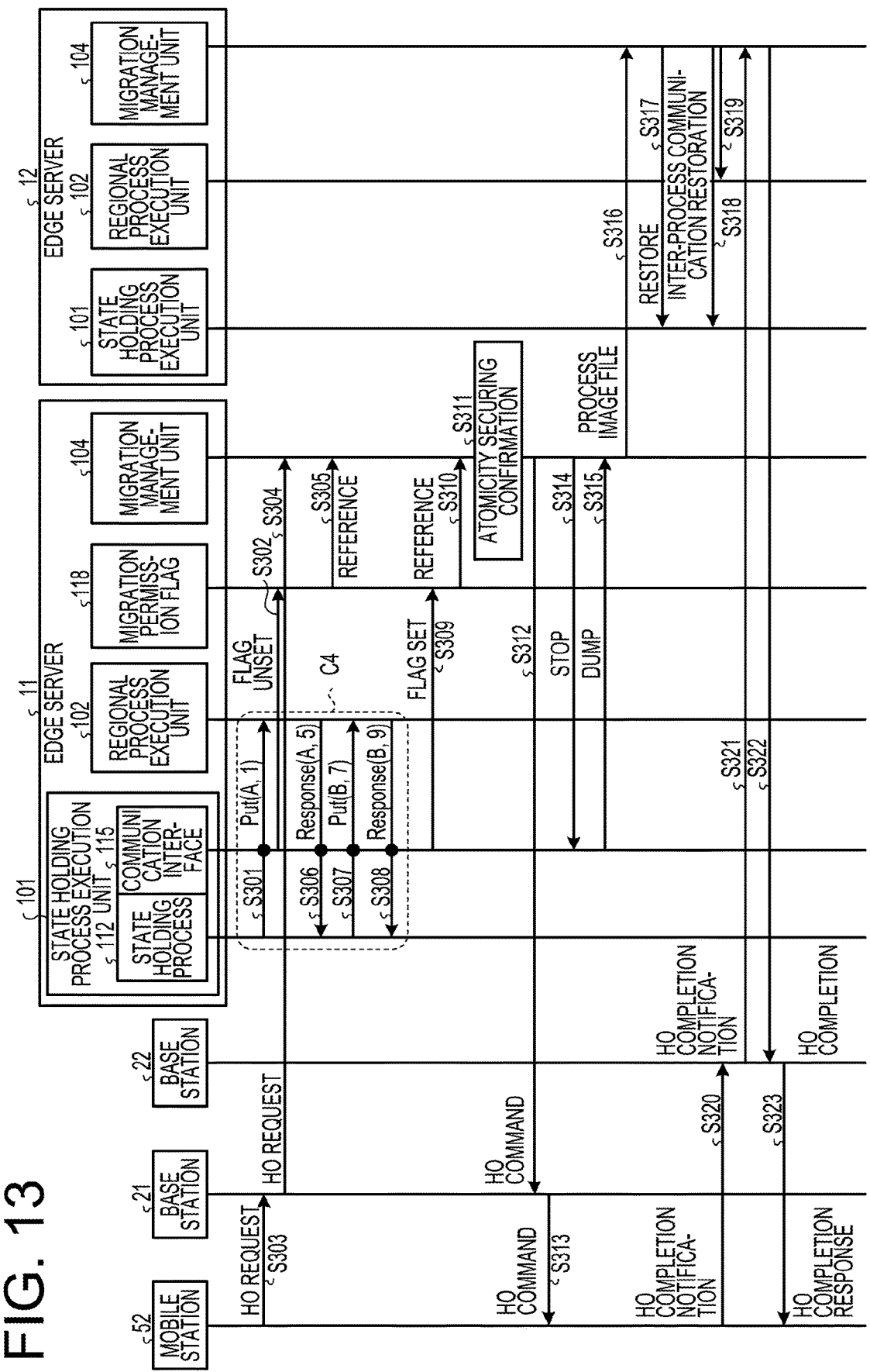
FIG. 13 is a sequence diagram of process migration processing in a communication system according to the second embodiment.

Next, a flow of process migration processing in the communication system 100 according to the present embodiment will be described with reference to FIG. 13. FIG. 13 is a sequence diagram of process migration processing in the communication system according to the second embodiment. In FIG. 13, the vertical axis represents the operation of each unit described on the upper portion of the vertical axis toward the paper surface. In addition, the vertical axis in FIG. 6 indicates that the time elapses as going downward toward the paper surface.

Before the handover request of the mobile station 52 occurs, the state holding process 112 executed by the state holding process execution unit 101 transmits "Put(A, 1)" included in an indivisible operation C4 to the regional process execution unit 102 via the communication interface 115 (operation S301). In FIG. 13, black circles placed on arrows representing communication indicate that the communication interface 115 is relaying the inter-process communication.

The communication interface 115 confirms that the indivisible operation C4 has been started, and unsets the migration permission flag 118 (operation S302).

In response to the migration from the cell 30 to the cell 40, the mobile station 52 transmits a handover request to the base station 21 (operation S303).

The base station 21 receives the handover request from the mobile station 52. Then, the base station 21 transmits the handover request to the migration management unit 104 of the edge server 11 (operation S304).

At this time point, the state holding process execution unit 101 and the regional process execution unit 102 perform the indivisible operation C4. Therefore, the communication interface 115 maintains the unset state of the migration permission flag 118. The migration management unit 104 refers to the migration permission flag 118 to confirm that the flag is in the unset state, and suspends the migration of the state holding process 112 (operation S305).

Meanwhile, the regional process execution unit 102 of the edge server 11 transmits "Response(A, 5)" included in the indivisible operation C4 to the state holding process 112 (operation S306). Next, the state holding process execution unit 101 of the edge server 11 transmits "Put(B, 7)" included in the indivisible operation C4 to the regional process execution unit 102 (operation S307). Next, the regional process execution unit 102 of the edge server 11 transmits "Response(B, 9)" included in the indivisible operation C4 to the state holding process execution unit 101 (operation S308).

The communication interface 115 executed by the state holding process execution unit 101 of the edge server 11 compares the pattern of the communication message transmitted and received in the operations S301 and S306 to S308 executed by the indivisible operation C4 with the communication protocol 150. When the pattern of the communication message transmitted and received in the operations S301 and S306 to S308 matches the message included in the indivisible operation registered in the communication protocol 150, the communication interface 115 determines that the atomicity of the inter-process communication has been secured. Then, the communication interface 115 sets the migration permission flag 118 (operation S309).

The migration management unit 104 of the edge server 11 refers to the migration permission flag 118 (operation S310).

Then, since the flag is set in the migration permission flag 118, the migration management unit 104 of the edge server 11 confirms the securing of atomicity (operation S311).

Next, the migration management unit 104 of the edge server 11 transmits a handover command to the base station 21 (operation S312).

The base station 21 receives the handover command from the migration management unit 104 of the edge server 11. Then, the base station 21 transmits the handover command to the mobile station 52 (operation S313).

The mobile station 52 receives the handover command from the base station 21. Then, the mobile station 52 starts the handover and executes switching of radio waves and synchronization of radio wave with the base station 22 as a handover destination. Meanwhile, the migration management unit 104 of the edge server 11 instructs the state holding process execution unit 101 to stop the state holding process 112, and stops the state holding process 112 (operation S314).

Next, the migration management unit 104 of the edge server 11 acquires a process image from the state holding process execution unit 101. Specifically, the migration management unit 104 acquires a process image by causing the memory 202 to output a dump of process image of the state holding process 112 (operation S315). Then, the migration management unit 104 of the edge server 11 generates a process image file including the process image.

Next, the migration management unit 104 of the edge server 11 transmits the generated process image file to the migration management unit 104 of the edge server 12 (operation S316).

The migration management unit 104 of the edge server 12 receives the process image file from the migration management unit 104 of the edge server 11. Then, the migration management unit 104 of the edge server 12 restores the state holding process 112 in the memory 202 (operation S317).

Thereafter, the migration management unit 104 of the edge server 12 causes the state holding process execution unit 101 of the edge server 12 to start executing the state holding process 112. Then, the migration management unit 104 of the edge server 12 restores the inter-process communication between the state holding process 112 and the regional process 122 between the state holding process execution unit 101 and the regional process execution unit 102 (operations S318 and S319).

Upon completion of the handover process, the mobile station 52 outputs a handover completion notification to the base station 22 (operation S320).

The base station 22 receives the handover completion notification from the mobile station 52. Then, the base station 22 transmits the handover completion notification to the migration management unit 104 of the edge server 12 (operation S321).

The migration management unit 104 of the edge server 12 receives the handover completion notification from the base station 22. Then, when the restoration of the inter-process communication between the state holding process 112 and the regional process 122 has been completed, the migration management unit 104 of the edge server 12 transmits a handover completion response to the base station 22 (operation S322).

The base station 22 receives the handover completion response from the migration management unit 104 of the edge server 12. Then, the base station 22 transmits the handover completion response to the mobile station 52 (operation S323).

The mobile station 52 receives the handover completion response. As a result, it becomes possible that the mobile station 52 transmits information to the state holding process execution unit 101 and the regional process execution unit 102 of the edge server 12 and receives a service.

Figure 14:
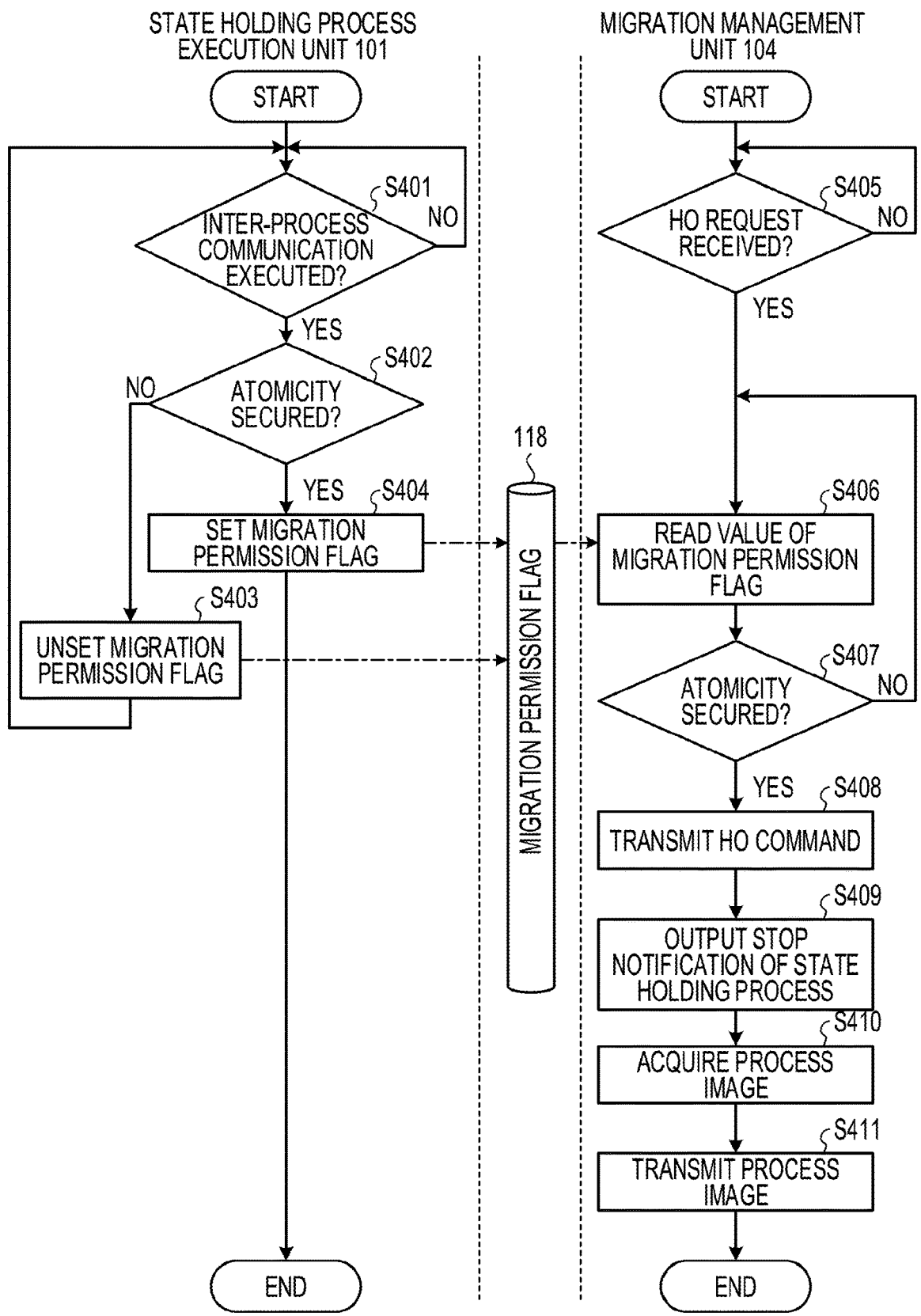
FIG. 14 is a flowchart of atomicity securing processing by the edge server according to the second embodiment.

Next, details of a flow of a process of securing the atomicity by the edge server 11 according to the present embodiment will be described with reference to FIG. 14. FIG. 14 is a flowchart of a process of securing the atomicity by the edge server according to the second embodiment. The left end toward the paper surface of an area divided by a broken line in FIG. 14 indicates a flow of process by the state holding process execution unit 101 and the right end indicates a flow of process by the migration management unit 104. An arrow indicated by an alternate long and short dashed line extending from each flow chart to the migration permission flag 118 indicates communication between the state holding process execution unit 101 or the migration management unit 104 and the migration permission flag 118.

The communication interface 115 of the state holding process execution unit 101 determines whether inter-process communication has been executed (operation S401). When it is determined that the inter-process communication has not been executed ("No" in operation S401), the communication interface 115 waits until the inter-process communication is executed.

In the meantime, when it is determined that the inter-process communication has been executed ("Yes" in operation S401), the communication interface 115 compares the pattern of the communication message transmitted and received by the inter-process communication with the communication protocol 150 to determine whether atomicity has been secured (operation S402).

When it is determined that the atomicity has not been secured ("No" in operation S402), the communication interface 115 unsets the migration permission flag 118 (operation S403). Thereafter, the communication interface 115 of the state holding process execution unit 101 returns to the operation S401.

In the meantime, when it is determined that the atomicity has been secured ("Yes" in operation S402), the communication interface 115 sets the migration permission flag 118 (operation S404).

Meanwhile, the migration management unit 104 determines whether a handover request has been received (operation S405). When it is determined that the handover request has not been received ("No" in operation S405), the migration management unit 104 waits until the handover request is received.

In the meantime, when it is determined that the handover request has been received ("Yes" in operation S405), the migration management unit 104 reads a value of the migration permission flag 118 (operation S406).

Then, the migration management unit 104 determines whether the atomicity of the inter-process communication has been secured, from the read value of the migration permission flag 118 (operation S407). When it is determined that the atomicity has not been secured ("No" in operation S407), the migration management unit 104 returns to the operation S406.

In the meantime, when it is determined that the atomicity has been secured ("Yes" in operation S407), the migration management unit 104 transmits a handover command (operation S408).

Next, the migration management unit 104 outputs a notification of stop of the state holding process 112 to the state holding process execution unit 101 (operation S409).

Next, the migration management unit 104 causes the memory 202 to output a dump of the state holding process 112 (operation S410).

Thereafter, the migration management unit 104 transmits a process image of the state holding process 112 output from the memory 202 (operation S411).

As described above, the communication system and the edge server according to the present embodiment determine whether the communication interface coupled to the state holding process secures the atomicity of the inter-process communication. Then, after the indivisible operation in the inter-process communication is completed, the state holding process is migrated to another edge server. In this way, it is also possible to determine whether the communication interface of the state holding process secures the atomicity. Even with such a configuration, it is possible to migrate the state holding process at the timing of securing the atomicity of the inter-process communication, thereby maintaining the continuity of service provision and securing the system stability.

It has been illustrated in each of the embodiments described above that the edge servers 11 and 12 correspond to the base station 21 and 22, respectively. However, the edge servers 11 and 12 may also operate in the same manner in other system configurations.

Figure 15:
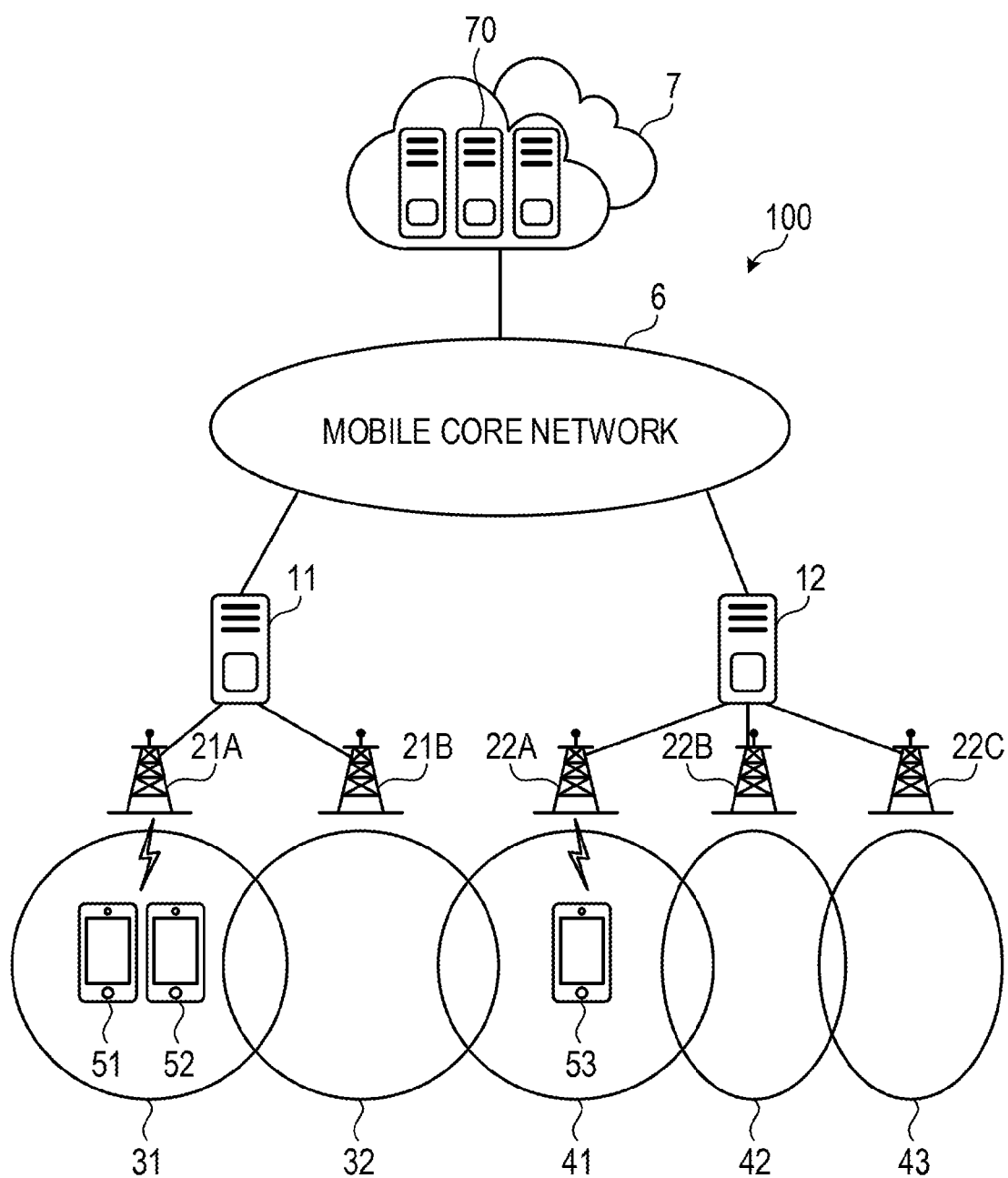
FIG. 15 is a system configuration diagram of a case where an edge server has jurisdiction over an area of plural base stations.

FIG. 15 is a system configuration diagram of a case where an edge server has jurisdiction over an area of plural base stations. A base station 21A forms a cell 31 and a base station 21B forms a cell 32. In addition, a base station 22A forms a cell 41, a base station 22B forms a cell 42, and a base station 22C forms a cell 43.

The edge server 11 is connected to the base stations 21A and 21B. In addition, the edge server 12 is connected to the base stations 22A to 22C. In this case, the state holding process execution unit 101 of the edge server 11 uses the state information of a mobile station located in the cells 31 and 32, such as the mobile station 52, to execute the state holding process 112. The regional process execution unit 102 of the edge server 11 processes information on the range of the cells 31 and 32.

In this way, even with a configuration in which the edge server 11 is connected to the plural base stations 21A and 21B, the edge server 11 may be able to migrate the state holding process at the timing of securing the atomicity of the inter-process communication, and it becomes possible to maintain the continuity of service provision and secure the system stability.

It has been illustrated in each of the above-described embodiments that the state holding process and the regional process are executed. However, a configuration in which at least one of two processes mutually performing an indivisible operation is migrated to another device, the same effects may be achieved by the same functions as each embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A communication device as a first communication device of a plurality of communication devices, comprising:
a memory; and
a processor coupled to the memory and the processor configured to:
execute a first process of holding a state of a terminal, based on information acquired from the terminal;
execute a second process by communicating with the first process; and
migrate the first process to a second communication device of the plurality of communication devices when it is detected that the terminal whose state is held by the processor is migrated from a first area managed by the first communication device to a second area managed by the second communication device and when a completion of an indivisible operation in communication between the first process and the second process is detected, based on a predetermined communication protocol.

2. The communication device according to claim 1, wherein the processor is further configured to:
monitor the communication between the first process and the second process; and
compare the communication protocol with the communication between the first process and the second process to detect the completion of the indivisible operation.

3. The communication device according to claim 1, wherein the processor is further configured to:
compare the communication protocol with the communication between the first process and the second process to detect the completion of the indivisible operation,
generate a transmission permission of the first process, and
migrate the first process to the second communication device, based on the transmission permission.

4. The communication device according to claim 1, wherein the communication protocol includes information for indicating a plurality of communication processing executed by the indivisible operation and arranged in an order of processing.

5. A communication system comprising:
a terminal configured to communicate any one of a plurality of communication devices; and
a communication device as a first communication device of the plurality of communication devices, including:
a memory; and
a processor coupled to the memory and the processor configured to:
execute a first process of holding a state of the terminal, based on information acquired from the terminal;
execute a second process by communicating with the first process; and
migrate the first process to a second communication device of the plurality of communication devices when it is detected that the terminal whose state is held by the processor is migrated from a first area managed by the first communication device to a second area managed by the second communication device and when a completion of an indivisible operation in communication between the first process and the second process is detected, based on a predetermined communication protocol.

6. A control method of a communication device as a first communication device of a plurality of communication devices, the control method comprising:
executing a first process of holding a state of a terminal, based on information acquired from the terminal;
executing a second process by communicating with the first process; and
migrating the first process to a second communication device of the plurality of communication devices when it is detected that the terminal whose state is held by the processor is migrated from a first area managed by the first communication device to a second area managed by the second communication device and when a completion of an indivisible operation in communication between the first process and the second process is detected, based on a predetermined communication protocol, by a processor.

* * * * *